United States Patent [19]
Rauckhorst, III

[11] Patent Number: 5,314,145
[45] Date of Patent: May 24, 1994

[54] COMPRESSIBLE NOSE DYNAMIC DE-ICER

[75] Inventor: Richard L. Rauckhorst, III, North Canton, Ohio

[73] Assignee: The B.F. Goodrich Company, Akron, Ohio

[21] Appl. No.: 998,283

[22] Filed: Dec. 30, 1992

[51] Int. Cl.$^5$ ............................................. B64D 15/18
[52] U.S. Cl. ............................................. 244/134 A
[58] Field of Search ........................ 244/134 R, 134 A

[56] References Cited

U.S. PATENT DOCUMENTS

| | | | |
|---|---|---|---|
| 3,604,666 | 9/1971 | Achberger | 244/134 A |
| 4,516,745 | 5/1985 | Ely et al. | 244/134 A |
| 4,595,442 | 6/1986 | Trares et al. | 244/134 A |
| 4,678,144 | 7/1987 | Goehner et al. | |
| 4,706,911 | 11/1987 | Briscoe et al. | |
| 4,875,644 | 10/1989 | Adams et al. | |
| 5,098,037 | 3/1992 | Leffel et al. | 244/134 A |
| 5,129,598 | 7/1992 | Adams et al. | 244/134 A |
| 5,143,325 | 9/1992 | Zieve et al. | |

OTHER PUBLICATIONS
WO81/00993 Blaser et al, Apr. 1981.

*Primary Examiner*—Galen L. Barefoot
*Attorney, Agent, or Firm*—Kevin L. Leffel

[57] ABSTRACT

A de-icer comprises a compressible member immediately subjacent an outer skin overlying an apex of a leading edge. The compressible member facilitates deflection of the outer skin overlying the compressible member toward the substructure when the skin deflection means deflects the outer skin.

43 Claims, 12 Drawing Sheets

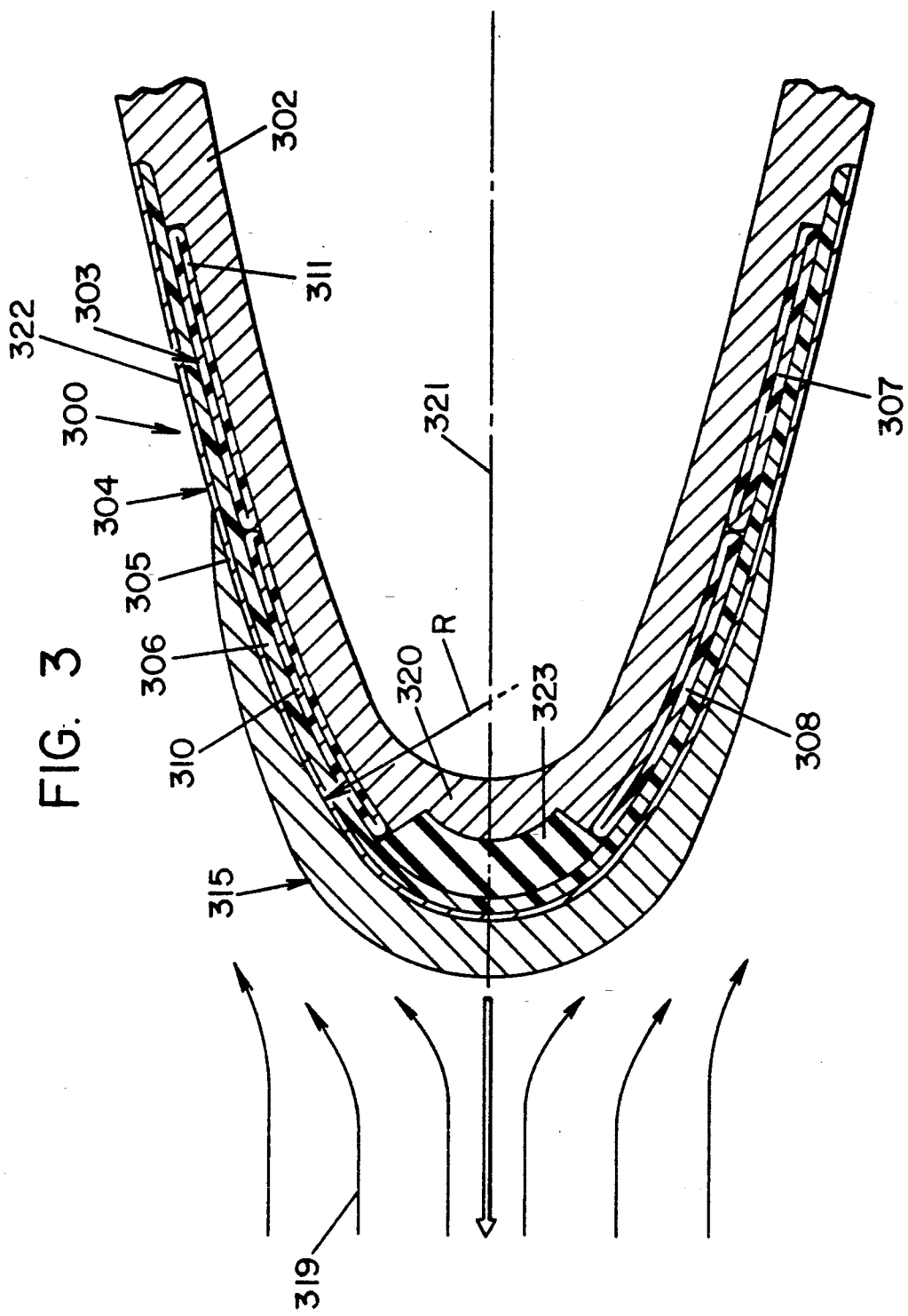

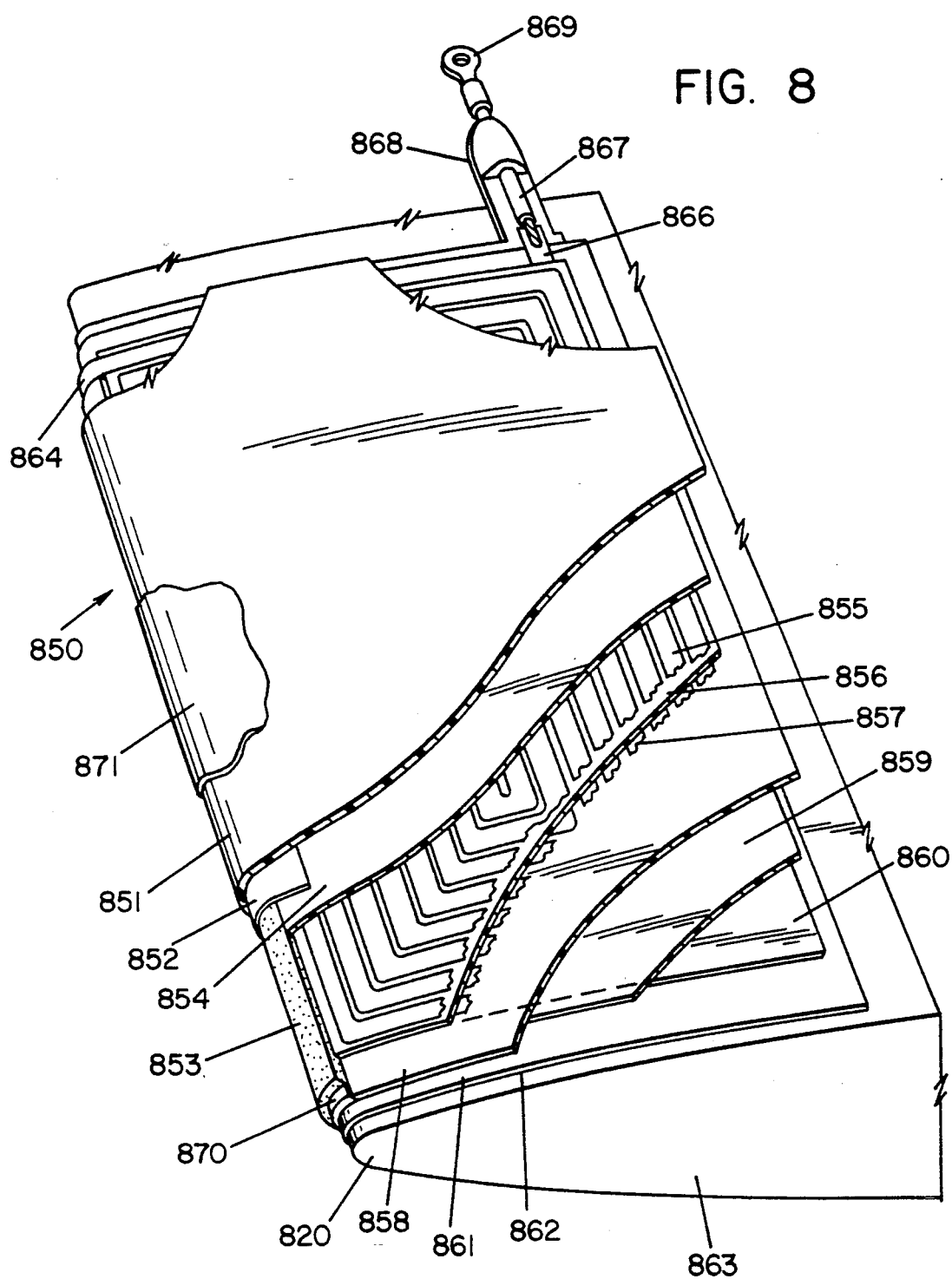

COMPRESSIBLE NOSE DYNAMIC DE-ICER

FIELD OF THE INVENTION

This invention relates to a class of de-icers that utilize dynamic motion to expel ice accumulated on various aircraft surfaces during flight in atmospheric icing conditions. Particularly, this invention relates to a mechanical de-icer of the type that utilize skin deflection means to dynamically activate a thin deflectable outer skin upon which ice accumulates. The invention comprises a compressible member immediately subjacent the skin overlying an area having the smallest radius of curvature on a leading edge.

BACKGROUND OF THE INVENTION

In recent years, many aircraft manufacturers have sought improved ice protection systems to enable aircraft to safely fly in atmospheric icing conditions. Ice accumulations on the leading edge surfaces of various aircraft structures can seriously effect the aerodynamic characteristics of an aircraft. Examples of such aircraft structures include wings, engine inlets, and horizontal and vertical stabilizers. A leading edge is that portion of a surface of a structure that functions to meet and break an airstream impinging upon the surface of an aircraft structure. The impinging airstream is induced during flight. Conventional pneumatic de-icers, electrothermal de-icers and bleed air anti-icers have been used for many years to protect the leading edges of general aviation or commercial aircraft. These ice protection techniques are described in detail by Technical Report ADS-4, Engineering Summary of Airframe Icing Technical Data published by the Federal Aviation Agency, December 1963. In spite of these proven techniques, many aircraft manufacturers and operators have expressed a desire for new systems having better ice removal performance, longer life and decreased weight and energy requirements.

In response to this need, a class of systems has been developed that utilize skin deflection means to dynamically activate a thin deflectable outer skin upon which ice accumulates. The dynamic activation induces rapid motion in the thin deflectable skin sufficient to dynamically debond, shatter and expel an accumulated ice cap into surrounding airflow. As will be discussed more fully, the skin deflection means can take a variety of forms.

In some devices, the skin deflection means are combined with the thin deflectable outer skin to form a unitary de-icer. The unitary de-icer is generally formed in a thin sheet that can be subsequently bonded to the leading edge surface of an existing aircraft structure. The de-icer is usually designed to be removed from the aircraft structure and replaced in the field requiring the use of a replaceable adhesive such as 3M 1300L rubber cement. Examples are presented in U.S. Pat. No. 4,706,911 METHOD AND APPARATUS FOR DE-ICING A LEADING EDGE, Briscoe et. al. (hereinafter referred to as the Pneumatic Impulse Patent), U.S. Pat. No. 4,875,644 ELECTRO-REPULSIVE SEPARATION SYSTEM FOR DEICING, Adams et al. (hereinafter referred to as the Electro-Repulsive Patent), and U.S. Pat. No. 5,129,598 ATTACHABLE ELECTRO-IMPULSE DE-ICER, Adams et al. (hereinafter referred to as the Electro-Impulse Patent). In other devices, the skin deflection means are combined with the thin deflectable outer skin and a reinforcing structure thereby forming a unitary leading edge structure with integral de-icing capability. The de-icer is permanently bonded to the reinforcing structure necessitating replacement of the entire assembly upon failure of the de-icer. An example of this type of device is presented in U.S. Pat. No. 5,098,037 STRUCTURAL AIRFOIL HAVING INTEGRAL EXPULSIVE SYSTEM, Leffel et al. (hereinafter referred to as the Integral Expulsive System Patent). For the purposes of this application, the structure to which the de-icer is attached will be referred to as the "substructure." Examples of substructures include an existing aircraft structure having a leading edge surface and a reinforcing structure as discussed above.

As mentioned previously, the skin deflection means can take a variety of forms. In the Electro-Repulsive Patent, the skin deflection means comprises an upper array of conductors and a lower array of conductors. The upper conductors are substantially parallel to each other and to adjacent conductors in the lower layer. The upper conductors are connected in series with the lower conductors so that a single continuous conductor is formed that passes from the upper layer, around the lower layer, back around the upper layer, and so on. Upon application of an electrical potential to the input leads, current is developed in the upper conductors that is in the same direction in all upper conductors. Likewise, current is developed in the lower conductors that is in the same direction in all lower conductors, but opposite to the direction of the current in the upper conductors. As explained in the Electro-Repulsive Patent, maintaining a constant current direction in all the conductors of a layer greatly increases the separation force between the two layers.

After installation of the de-icer on a substructure, the upper and lower conductors are sandwiched between the structural member and a surface ply (the surface ply is analogous to a thin deflectable skin). Upon application of a high magnitude short duration current pulse, opposing electromagnetic fields in the upper and lower layers forcefully repel each other. This motion induces a dynamic motion into the surface ply which dynamically removes accumulated ice. As described in the Electro-Repulsive Patent, a current pulse that rises to between 2300 and 3100 amperes within 100 microseconds generates effective ice removal. A circuit for generating such a pulse is described in the Electro-Repulsive Patent. The circuit includes a pulse forming network, but this is not absolutely necessary.

Another form for the skin deflection means utilizing electromagnetic apparatus is illustrated by the Electro-Impulse Patent. A planar coil comprising at least one coiled conductor is sandwiched between a surface ply and a conductive substructure (such as the leading edge of an aluminum aircraft structure). Planar coils are described in great detail in U.S. Pat. No. 5,152,480 PLANAR COIL CONSTRUCTION, Adams et al. (hereinafter referred to as the Planar Coil Patent). As described in the Electro-Impulse Patent, a high magnitude short duration current pulse is applied to the coil. The current in the coil induces a strong rapidly changing electromagnetic field. The electromagnetic field generates eddy currents in the conductive substructure which, in turn, generates an opposing electromagnetic field. The two electromagnetic fields repel each other causing a repelling force between the coil and the substructure. The coil induces dynamic motion into the surface ply thereby dynamically removing accumulated ice. Effective ice removal is generated by a peak current of about 3000 amperes rising in a period of 100 microseconds. An electrical circuit for generating such a pulse is disclosed. The circuit is very similar to the circuit disclosed in the Electro-Repulsive Patent.

In the previous example, the skin deflection means is composed of a single unitary planar coil. A target may also be required if the substructure does not have sufficient electrical conductivity to effectively develop eddy currents. A target would be required with a fiber reinforced plastic substructure, or a conductive substructure that is too thin to effectively develop eddy currents. The target is a sheet of conductive material such as copper or aluminum that is located adjacent one surface of the coil. The coil and target are forcefully repelled from each other upon application of a high magnitude short duration current pulse to the coil due to opposing magnetic fields generated by current in the coil and by eddy currents in the target. This motion induces dynamic motion into the surface ply which dynamically removes accumulated ice. The target can be formed as a part of the substructure or can be formed as a part of the thin force and displacement generation means. Also, as described in the Electro-Impulse Patent, either the target or the coil can be located immediately subjacent the outer skin. The target applies the motive force to the skin if it is located subjacent the skin. Conversely, the coil applies the motive force to the skin if it is located subjacent the skin.

The Planar Coil Patent also teaches an electro-repulsive variation similar to the Electro-Repulsive Patent. Two mirror image unitary planar coils are superposed relative to each other and electrically connected so that upon application of a high magnitude short duration current pulse to each coil, current direction is opposite in each coil. Opposing electromagnetic fields are generated in the coils which causes each coil to forcefully repel the other. This motion induces a mechanical impulse into the surface ply which removes accumulated ice. This approach differs from the Electro-Repulsive Patent which utilizes a single conductor to form the upper and lower conductors.

A type of skin deflection means that utilizes pressurized gas is described in the Pneumatic Impulse Patent and the Integral Expulsive System Patent. A plurality of pneumatic impulse tubes extend in a spanwise direction subjacent a thin deflectable outer skin. The tubes and skin are supported by a fiber reinforced plastic substructure which together form a leading edge structure with integral de-icing capability. Special fittings are integrated into the tubes at various locations spaced along the span of each tube. A pneumatic impulse valve is attached to each fitting. A suitable valve is described in U.S. Pat. No. 4,878,647 PNEUMATIC IMPULSE VALVE AND SEPARATION SYSTEM, Putt et al. The valve contains a small volume (about 1 cubic inch) of high pressure air (500 to 5,000 psig). Upon activation by a solenoid, the valve quickly releases the pressurized air into each tube via the fitting. The expanding air pulse causes the tube to expand and induce mechanical motion into the skin thereby dynamically expelling accumulated ice. The expanding air pulse most preferably inflates the tube in less than 500 microseconds.

As evidenced by these patents, many variations of skin deflection means have been developed. The Electro-Repulsive Patent, Electro-Impulse Patent, Planar Coil Patent, Pneumatic Impulse Patent, and Integral Pneumatic Impulse Patent provide examples of the types of structure that can serve as skin deflection means. In each example, the skin deflection means generates a force that causes the skin to be deflected away from the substructure. These patents are intended to be merely representative, and the types of structures that can serve as skin deflection means is not limited to the specific teachings of these patents.

Certain devices in the art are presented in FIGS. 1 and 2. The de-icers of FIGS. 1 and 2 have skin deflection means of the type that utilize compressed air as described by the Pneumatic Impulse Patent and Integral Expulsive System Patent. Unless noted otherwise, the following discussion applies equally as well to skin deflection means that utilize electromagnetic apparatus similar to those presented in the Electro-Repulsive Patent, Electro-Impulse Patent, and Planar Coil Patent. Referring to FIG. 1, a de-icer 100 is shown attached to a substructure 102 which serves to support the de-icer 100. An outer surface 122 meets and breaks an impinging airstream 119. Ice cap 115 is deposited by the airstream 119 during flight in atmospheric icing conditions. The section shown in FIG. 1 is a chordwise cross-section. The chordwise direction is defined as being approximately parallel to the direction of the impinging airstream 119 as it passes around the de-icer 100 and substructure 102. The de-icer 100 and substructure 102 also extend in a spanwise direction which is generally perpendicular to the chordwise direction. The de-icer and substructure can either be straight or have curvature in the spanwise direction. If de-icer 100 is applied to an engine inlet, the spanwise direction corresponds to the circumference of the inlet. In practicing the invention, the spanwise curvature can generally be ignored. Therefore, for the purposes of this application, the term "curvature" refers only to curvature measured in the plane of the chordwise section.

The outer surface 122 has a radius of curvature R that changes depending on the chordwise position along the outer surface 122. The radius of curvature R is measured perpendicular to the outer surface 122 in a chordwise plane. De-icer 100 and substructure 102 have an apex 120. The term "apex" is intended to refer to the portion of a de-icer and substructure underlying the area of the outer surface where the radius of curvature is smallest. The outer surface 122 defines a typical curvature wherein the smallest radius of curvature R is over the apex 120 and the radius of curvature R increases with distance from the apex 120.

De-icer 100 is comprised of a skin 104 and skin deflection means 103. Substructure 102 can be formed from metal, such as aluminum, or from fiber reinforced plastic, such as a plurality of reinforcing plies impregnated with plastic matrix (for example, plies of fabric formed from carbon, glass, or Kevlar ® fibers impregnated with epoxy resin). The outer surface of the de-icer forms the outer surface 122.

The thin deflectable skin 104 is composed of an erosion resistant layer 105 and a backing layer 106. The erosion resistant layer can be formed from nearly any film having good erosion resistant properties. Titanium 15-3 alloy 0.005 inch thick and polyether-ether-ketone (PEEK) ranging from 0.007 to 0.016 inch thick have been used for erosion layer 105. The backing layer 106 can either support and reinforce the erosion layer, or it can serve to bond the erosion layer to the skin deflection means 103. Epoxy and nitrile phenolic film adhesives have been used for the backing layer 106.

The skin deflection means 103 has five expandable tubes 107∝111 that abut each other along an edge of each tube. Tubes 107-111 can be formed from plastic coated fabric, such as nitrile phenolic impregnated nylon fabric, or from rubber coated fabric such as neoprene coated nylon fabric. The tubes 107-111 are described in greater detail in the Pneumatic Impulse Patent and Integral Expulsive System Patent. One tube 109 overlies the apex 120. Tube 110 is shown inflated. Deflections of skin 104 over tubes 108 and 109 are shown by phantom lines 112 and 113 respectively. Tubes 107-111 are sequentially inflated by pulses of compressed air as described in the Pneumatic Impulse Patent or Integral Expulsive System Patent. Inflation of the tubes 107-111 induces dynamic motion in the skin 104 and ice cap 115 is debonded and shattered into side ice-pieces 116 and 118, and nose ice-piece 117, which are ejected into impinging airstream 119. Centerline 121 bisects the de-icer 100 and substructure 102. Depending on the angle of the incoming airflow in relation to the centerline 121, ice accumulation 115 could shift to predominantly one surface or the other. For example, if the incoming airflow rotates to below the centerline 121, the ice cap would shift back over tube 107 and forward over only part of tube 110. The amount of shift depends on the magnitude of the angle between the incoming airflow 119 and the centerline 121 which is a function of aircraft flight and airflow characteristics. Tubes 107 and 111 are provided to protect against shifts in the ice cap 115. They are normally activated sequentially with tubes 108-110 as part of a single activation cycle.

Referring now to FIG. 2, de-icer 200 represents another arrangement for the skin deflection means. De-icer 200 is shown attached to substructure 202 that has an apex 220. De-icer 200 comprises skin 204 and skin deflection means 203. The de-icer 200 and substructure 202 are bisected by a centerline 221, and de-icer 200 has an outer surface 222. The outer surface 222 has a radius of curvature R that changes with distance from the apex 220. Here, the skin deflection means 203 has only four tubes 207, 208, 210 and 211 arranged such that the edges of tubes 208 and 210 abut directly over the apex 220. Skin 204 includes a backing layer 206 and an erosion resistant layer 205. The substructure 202, skin deflection means 203 and skin 204 can be constructed from the same materials as the substructure 102, skin deflection means 103 and skin 104 of de-icer 100. An ice cap 215 is deposited by an impinging airstream 219 and is shown debonded and shattered into side ice-pieces 216 and 218, and nose ice piece 217. The ice cap 215 is debonded and shattered by activation of the skin deflection means 203 as discussed previously in relation to skin deflection means 103 of de-icer 100. As before, tubes 207 and 211 are provided to protect against shifts in the ice cap 215. De-icer 200 is shown in an activated state by inflation of tube 210. Deflected profile of skin 204 induced during subsequent inflation of tube 208 is shown as a phantom line 212. Tube 210 is inflated by a pulse of compressed air which forces the skin 204 to rapidly move outward. The motion of skin 204 during inflation of tube 210 causes the ice cap 215 over tube 210 to debond and shatter into ice-pieces 218 which are ejected into the airstream 219. During subsequent inflation of tube 208, ice cap 215 debonds and shatters over tube 208 and side ice-pieces 216 are ejected into the airstream 219. Nose ice-piece 217 is located over the area where tubes 208 and 210 abut. As shown, deflection of skin 204 over the edge of a tube is small in comparison to the deflection over the center of a tube. Therefore, activation of skin 204 over the apex 220 of de-icer 200 is much less than activation of skin 104 over the apex 120 of de-icer 100. De-icer 100 is generally more effective than de-icer 200 in removing ice over an apex. However, depending on the radius of curvature over the apex, neither may effectively remove ice.

Referring to de-icer 100 of FIG. 1 and de-icer 200 of FIG. 2, the radius of curvature R over apexes 120 and 220, respectively, can have an adverse effect on ice removal performance. De-icer 100A of FIG. 1A illustrates how the geometry of the leading edge can effect ice removal performance. De-icer 100A is shown attached to the substructure 102. Like numbered components of de-icer 100 of FIG. 1 and de-icer 100A of FIG. 1A are equivalent. A skin deflection means 103A is comprised of five tubes 107A-111A. Tubes 107-111 are identical to tubes 107A-111A except for the width of each tube. The tube 109A overlying the apex 120 is wider than tube 109. Tube 109A is shown inflated. Due to the position dependent curvature of the outer surface 122, tube 109A tends to inflate on the sides, where the radius of curvature is greater, away from the apex 120, where the radius of curvature is lesser. Tube 109A has an outer wall 109A' which is pulled down over the very tip of the apex 120 resulting in almost no force application to the skin 104 over the tip of the apex 120. Therefore, side ice-pieces 116 and 118 are removed, but nose ice-piece 117 located over the apex 120 is not removed. This phenomenon has been observed in numerous icing wind tunnel tests.

Referring to de-icer 100 of FIG. 1, tube 109 also has an outer tube wall 109'. If the curvature of the apex 120 is not too great, and the width of tube 109 is narrow enough, the outer tube wall 109' can deflect outward, as shown in FIG. 1, and apply force to the skin 104 over the tip of the apex 120 resulting in skin deflection 113. Ice piece 117 will be ejected. De-icer 200 of FIG. 2 may provide a viable solution depending on geometry. As a general guideline, de-icer 100 of FIG. 1 is suitable if the radius of curvature R over apex 120 is greater than about 1.0 inch. In contrast, de-icer 200 of FIG. 2 is suitable if the radius of curvature of apex 220 is between about 0.5 and 1.0 inch. However, de-icer 200 can be unsatisfactory for use with leading edge geometries having a radius of curvature R over apex 220 less than about 0.5 inch. A propeller blade represents a type of leading edge geometry that often has an apex radius of curvature of less that 0.5 inch. An effective means of removing ice over an apex having a small radius of curvature is desired.

In addition to ice removal performance, life of a de-icer represents another very important consideration. For the purposes of this application, de-icer life is defined as the length of time a de-icer can continuously operate before the de-icer mechanically fails. The components of the de-icer are subjected to a stress cycle each time the de-icer is activated. These stress cycles accumulate and eventually cause a de-icer to mechanically fail due to fatigue. There are two ways to increase the life of a de-icer similar to de-icers 100 or 200 without changing materials. The cycle rate can be decreased (fewer cycles per minute), or the stress levels can be reduced. Reducing the cycle rate usually is not an option because flight conditions and ice accumulation characteristics of an aircraft are usually fixed.

The other option, reducing the stress levels, is limited because skin deflection in de-icers similar to de-icers 100 or 200 is achieved predominantly by stretching the skin. Referring to de-icer 100 of FIG. 1, the substructure 102 is relatively rigid and stretching the skin 104 is the only way deflection of skin 104 over any of tubes 107–111 is achieved. Referring to de-icer 200 of FIG. 2, this is also true of skin 204, tubes 207–211 and substructure 202. Referring to de-icer 100 of FIG. 1, a maximum deflection 114 in skin 104 over tube 110 is presented. In general, the maximum deflection 114 ranges between about 0.020 inch to about 0.060 inch. The maximum deflection 114 depends mostly on two variables; (1) modulus of elasticity of the skin 104, and (2) the magnitude of force generated by tube 110. For a given set of materials, the maximum deflection 114 can be achieved only by increasing the force generated by tube 114 to a sufficient magnitude. Increasing the force increases stresses in tube 110 and skin 104 thereby decreasing life. Referring to de-icer 200 of FIG. 2, the same is also true in relation to maximum deflection 214 of skin 204 over tube 210 of de-icer 200. Therefore, a means of obtaining a maximum deflection in a thin deflectable skin while maintaining lower stresses in the skin and skin deflection means is desired. Decreasing the stresses in the skin and skin deflection means results in a de-icer having longer life.

In addition to ice removal, energy consumption and weight are also of primary importance. De-icers similar to de-icers 100 and 200 have an "active area." The term "active area" refers to that portion of the outer skin that is dynamically activated by the thin force and displacement generation means in a manner that removes ice accumulations. For example, the active area of deicer 100 includes any area of skin 104 covering tubes 107–111 and the active area of de-icer 200 includes any area of skin 204 covering tubes 207–211. Normally, as evidenced by de-icers 100 and 200, the surface area of the skin deflection means 103 and 203 must equal the active area. Reducing the surface area of the skin deflection means reduces the energy consumption of the de-icer. However, the active area required for a particular application is usually fixed. Therefore, a way of reducing the surface area of the skin deflection means without reducing the active area is desired in order to provide a de-icer having decreased energy consumption. Also, since the skin deflection means represent a significant portion of the weight of a dynamic de-icer, reducing the surface area of the skin deflection means in relation to the active area should also reduce weight.

In the context of a pneumatic impulse embodiment, the force required to deflect the outer skin bears on energy consumption and weight in a manner that is even less apparent. For de-icers similar to de-icers 100 and 200 of FIGS. 1 and 2, the pulse propagation distance generally decreases as the modulus of the skin increases. Pulse propagation distance refers to the distance from a valve along the span of a tube over which ice is effectively removed. In general, skin deflection and dynamics decrease with distance from a valve because the pulse of compressed air is constantly expanding and the peak pressure inside the tube decreases with distance from the valve. For example, if the erosion layer 105 or 205 is formed from 0.005 inch thick 15-3 titanium alloy, the pulse may generate effective ice removal about two feet on either side of a valve. Therefore, the distance between valves would be about four feet in order to provide effective ice removal along the span of a tube. Four valves per tube would be required for a sixteen foot span. For an ice protector having five tubes, a total of twenty valves would be required. By increasing the pulse propagation distance, the space between valves can be increased. Increasing the space between valves reduces the number of valves and the total weight of the system. Reducing the number of valves also increases the reliability of the system by reducing the number of mechanical components. Therefore, means of increasing the pulse propagation distance between valves is desired in order to increase reliability and decrease energy consumption and weight.

The devices described above represent advancements over previous de-icing systems. In spite of these advancements, means of improving ice removal performance, life, reliability, weight, and energy consumption are of continuing interest. In particular, a de-icer is desired exhibiting the excellent ice removal performance typical of the devices described above while having increased life, reduced weight, and reduced energy consumption.

SUMMARY OF THE INVENTION

The invention comprises a dynamic mechanical de-icer adapted for attachment to a substructure, the de-icer having an outer surface that meets and breaks an impinging airstream when attached to the substructure, the substructure having an apex corresponding to the portion of the de-icer and substructure underlying the area of the outer surface where the radius of curvature is smallest, comprising:

skin means for transferring tension from a first area of said skin means to a second area of said skin means upon deflection of said first area away from the substructure, said skin means overlying the substructure with said first area spaced to one side of the apex and said second area at the apex;

skin deflection means disposed beneath said skin means for deflecting said deflectable skin away from the substructure; and compressible means disposed beneath said skin means for permitting deflection of said second area toward the substructure by compressing in response to tension transferred by said skin means from said first area to said second area upon deflection of said first area away from the substructure.

According to an aspect of the invention, said compressible member divides said skin deflection means, said compressible member being immediately subjacent said skin, and said skin deflection means abuts said compressible member.

According to another aspect of the invention, said skin deflection means overlies said compressible member, said skin deflection means being immediately subjacent said skin.

According to a further aspect of the invention, said thin deflectable skin includes at least one layer of fiber reinforced plastic that selectively stiffens said skin in a predetermined area.

According to a further aspect of the invention, the substructure has a chordwise direction generally parallel to the direction of the impinging airstream and a spanwise direction in which the substructure extends generally perpendicular to the chordwise direction, and said skin deflection means comprises at least two expandable tubes extending in the spanwise direction, one each on either side of said compressible member, each said tube abutting said compressible member.

According to a further aspect of the invention, said skin deflection means comprises at least two expandable tubes extending in the spanwise direction, said tubes abutting each other over said compressible member.

According to a further aspect of the invention, said skin deflection means comprises at least three expandable tubes extending in the chordwise direction, one tube overlying said compressible member, the other two tubes being disposed on either side of and abutting said tube overlying said compressible member.

According to a further aspect of the invention, said skin deflection means comprises electromagnetic apparatus, said electromagnetic apparatus being of the type that utilizes a high magnitude short duration current pulse to develop opposing electromagnetic fields that cause said skin to be deflected from the substructure.

According to a further aspect of the invention, said electromagnetic apparatus includes at least one coil, said high magnitude short duration current pulse being applied to each coil, each coil including:

- a first, sheet-like member defined by a first, continuous, electrical conductor having a plurality of turns and first and second ends, said first end of said first conductor defining an electrical input and said second end of said first conductor defining an electrical output;
- a second, sheet-like member defined by a second, continuous, electrical conductor having a plurality of turns and first and second ends, said first end of said second conductor defining an electrical input, and said second end of said second conductor defining an electrical output;
- an electrical connection between said second end of said first conductor and said first end of said second conductor; and
- said first and second sheet-like members being disposed parallel to each other with selected turns of said first electrical conductor being positioned adjacent to selected turns of said second electrical conductor such that said direction of current flow through the turns of said first conductor is in the same direction as the current flow through the turns of said second conductor.

According a further aspect of the invention, said electromagnetic apparatus comprises at least two coils, one each on either side of said compressible member, each coil abutting said compressible member.

According to a further aspect of the invention, said electromagnetic apparatus comprises a target adjacent each coil, said target being superposed over said coil, said coil being separable from said target, one of the opposing electromagnetic fields being developed by said coil upon application of said high magnitude short duration current pulse and the other opposing electromagnetic field being developed in said target by eddy currents induced by said coil electromagnetic field.

According to a further aspect of the invention, said electromagnetic apparatus comprises at least two coils, said coils being adjacent each other with one coil superposed over said other coil, said coils being separable from each other, one of the opposing electromagnetic fields being developed upon application of said high magnitude short duration current pulse to one coil and the other opposing electromagnetic field being developed upon application of said high magnitude short duration current pulse to said other coil, said coils being electrically interconnected such that current direction in said selected turns of said conductor of one coil is opposite to said current direction in said selected turns of said conductor of said other coil.

According to a still further aspect of the invention, said skin deflection means includes electromagnetic apparatus, the electromagnetic apparatus comprising at least two coils abutting each other along an edge overlying the apex, said high magnitude short duration current pulse being applied to each coil.

According to a further aspect of the invention, said skin deflection means includes electromagnetic apparatus, said electromagnetic apparatus comprising at least three coils, one coil overlying said compressible member in between and abutting said other two coils, said high magnitude short duration current pulse being applied to each coil.

BRIEF DESCRIPTION OF THE DRAWINGS

FIG. 3 is a fragmentary sectional view of a de-icer embodying the invention attached to a substructure, depicted in the inactivated state;

FIG. 8 is a fragmentary isometric view of a best mode de-icer for a propeller blade.

DETAILED DESCRIPTION

Figure 1:
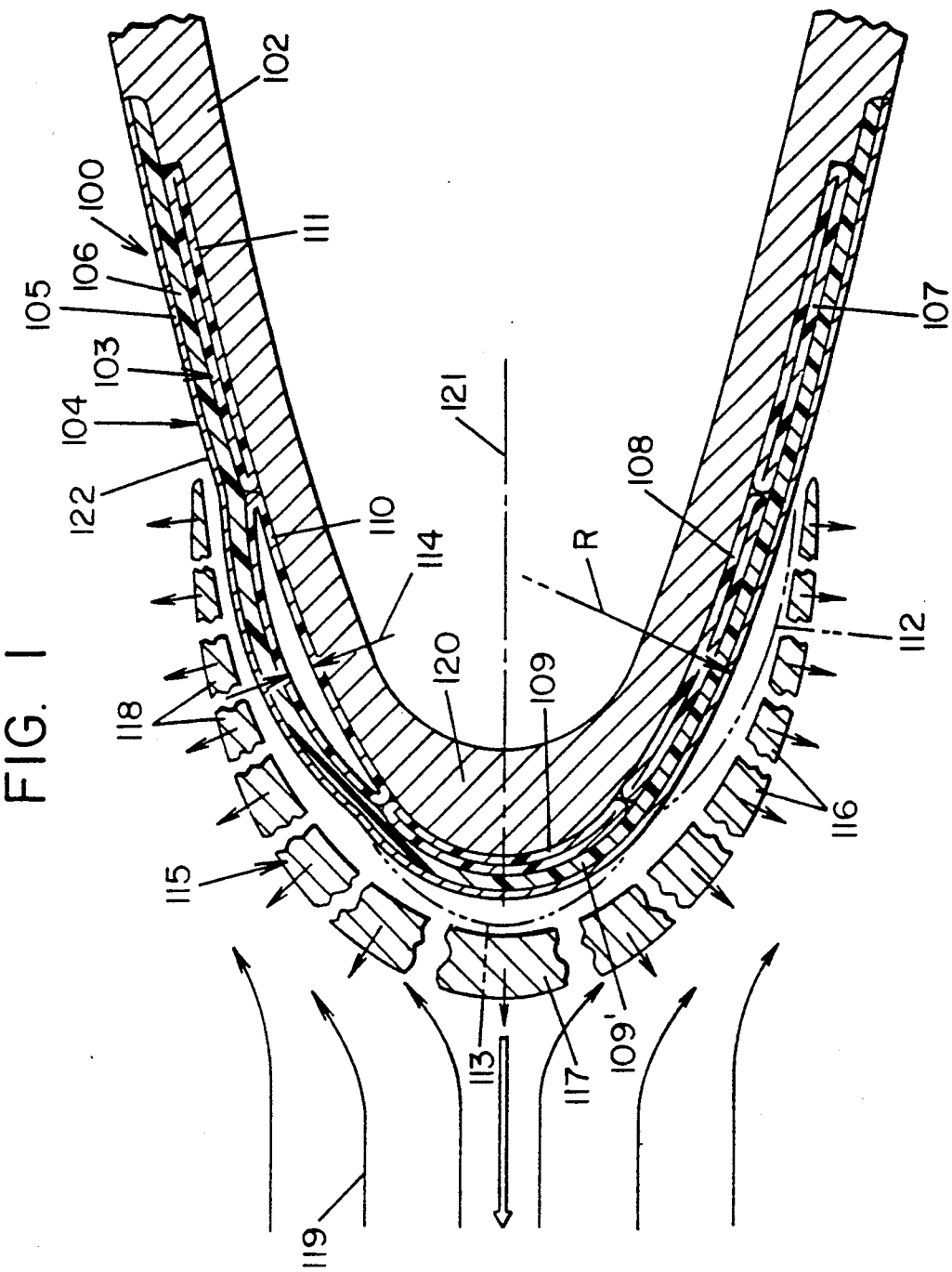
FIG. 1 is a fragmentary sectional view of a certain de-icer in the art attached to a substructure.
Figure 1A:
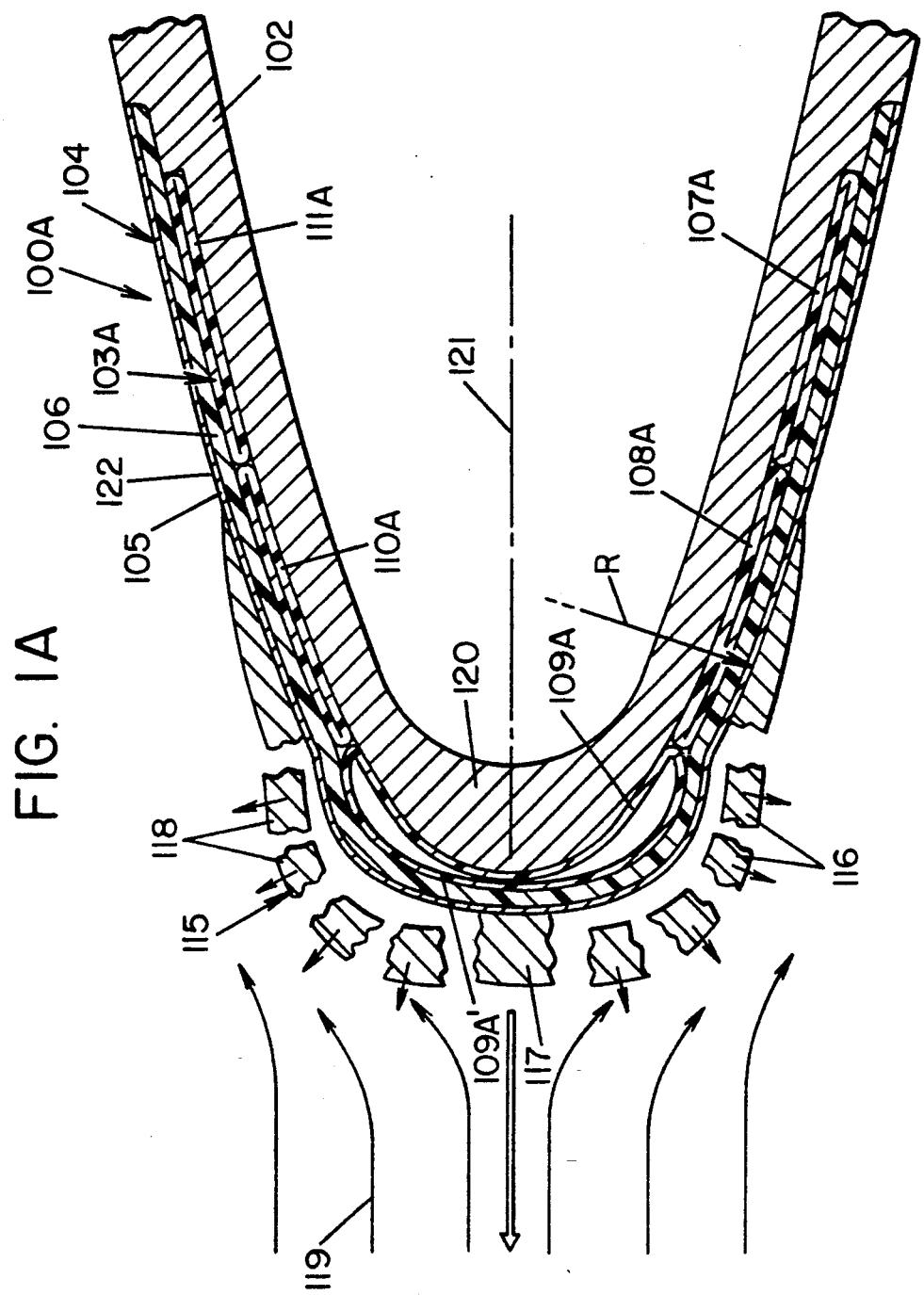
FIG. 1A is a fragmentary sectional view of an alternate embodiment of the de-icer depicted in FIG. 1.

The invention comprises a new structure for a mechanical impulse de-icer that changes the way in which the outer skin is deflected. Referring to FIG. 3, a de-icer 300 embodying the invention is presented. A de-icer 300 is shown attached to a substructure 302. Centerline 321 bisects de-icer 300 and substructure 302. De-icer 300 and substructure 302 have a chordwise and spanwise direction as previously discussed in relation to de-icers 100 and 200 of FIGS. 1 and 2. De-icer 300 also has an apex 320. A surrounding airflow 319 is shown impinging upon de-icer 300. An ice cap 315 is deposited by the airflow 319 during flight in atmospheric icing conditions. The section shown in FIG. 3 is a chordwise cross-section. De-icer 300 has an outer surface 322 the functions to meet and break the impinging airstream 319. The outer surface 322 has a radius of curvature R, measured perpendicular to the outer surface 322, that changes depending on the chordwise position along the outer surface 322 as discussed previously in relation to de-icers 100 and 200 of FIGS. 1 and 2.

De-icer 300 comprises a thin deflectable skin 304, skin deflection means 303, and a compressible member 323. In the embodiment presented, the skin deflection means 303 comprises four expandable tubes 307-311. The tubes are activated by sequentially releasing small quantities of compressed gas into each tube as described by the Integral Expulsive System Patent, U.S. Pat. No. 5,098,037, which is fully incorporated herein by reference. The skin deflection means 303 can also take forms utilizing electromagnetic apparatus. Examples are presented in the Electro-Impulse Patent, U.S. Pat. No. 5,129,598 and the Planar Coil Patent U.S. Pat. No. 5,152,480 the disclosures of which are fully incorporated herein by reference. Unless noted otherwise, the discussion that follows relates with equal force to dynamic de-icers that utilize skin deflection means comprising electromagnetic apparatus.

In the embodiment presented, compressible member 323 divides the skin deflection means 303. The skin deflection means 303 abut the compressible member 323 which is immediately subjacent the skin. The substructure 302 provides the structural integrity necessary to absorb and resist flight loads and unexpected impacts with foreign objects. The substructure can be formed from a metal, such as aluminum, or fiber reinforced plastic materials that are commonly used on aircraft such as epoxy impregnated glass or graphite fabrics. The skin 304 includes a backing layer 306 and a layer of erosion resistant material 305. The backing layer 306 can be formed from fiber reinforced plastic material, such as nitrile phenolic or epoxy impregnated into a fabric composed of fibers belonging to one of a group including carbon fibers, glass fibers, and nylon fibers. The erosion layer 305 can be formed from rubber, metal, or plastic, such as neoprene, titanium foil, polyether-ether-ketone film, polyurethane film, and polyurethane paint depending on the application. The erosion layer 305 is necessary to provide resistance to impact from rain, sand, and other debris that would damage the backing layer 306. The skin 304 and compressible member 323 must have elastic properties. The term "elastic" refers to the tendency of a material to return entirely to its rest state within a short period of time after an imposed force is removed. Examples of suitable materials for the compressible member include natural rubber, and synthetic rubbers such as butyl or silicone rubber. The skin 304, skin deflection means 303, and substructure 302 can be permanently bonded together to form a unitary structure with integral ice removal capability as described in the Integral Expulsive System Patent. Alternatively, the skin 304 and skin deflection means 303 can combined into a unitary structure which is then attached to an existing aircraft substructure 302.

In the embodiment presented, the skin deflection means 303 consists of four expandable tubes 307-311. The expandable tubes 307-311 can be formed from fiber reinforced plastic material such as nitrile phenolic coated nylon fabric, or rubber coated fabric such as neoprene coated nylon fabric. The de-icer 300 is activated by sequentially releasing small quantities of compressed air into the tubes 307-311 as described in the Pneumatic Impulse Patent or Integral Expulsive System Patent. Inflation of a tube is preferably achieved in less than 0.1 second and most preferably in less than 500 microseconds.

Figure 3A:
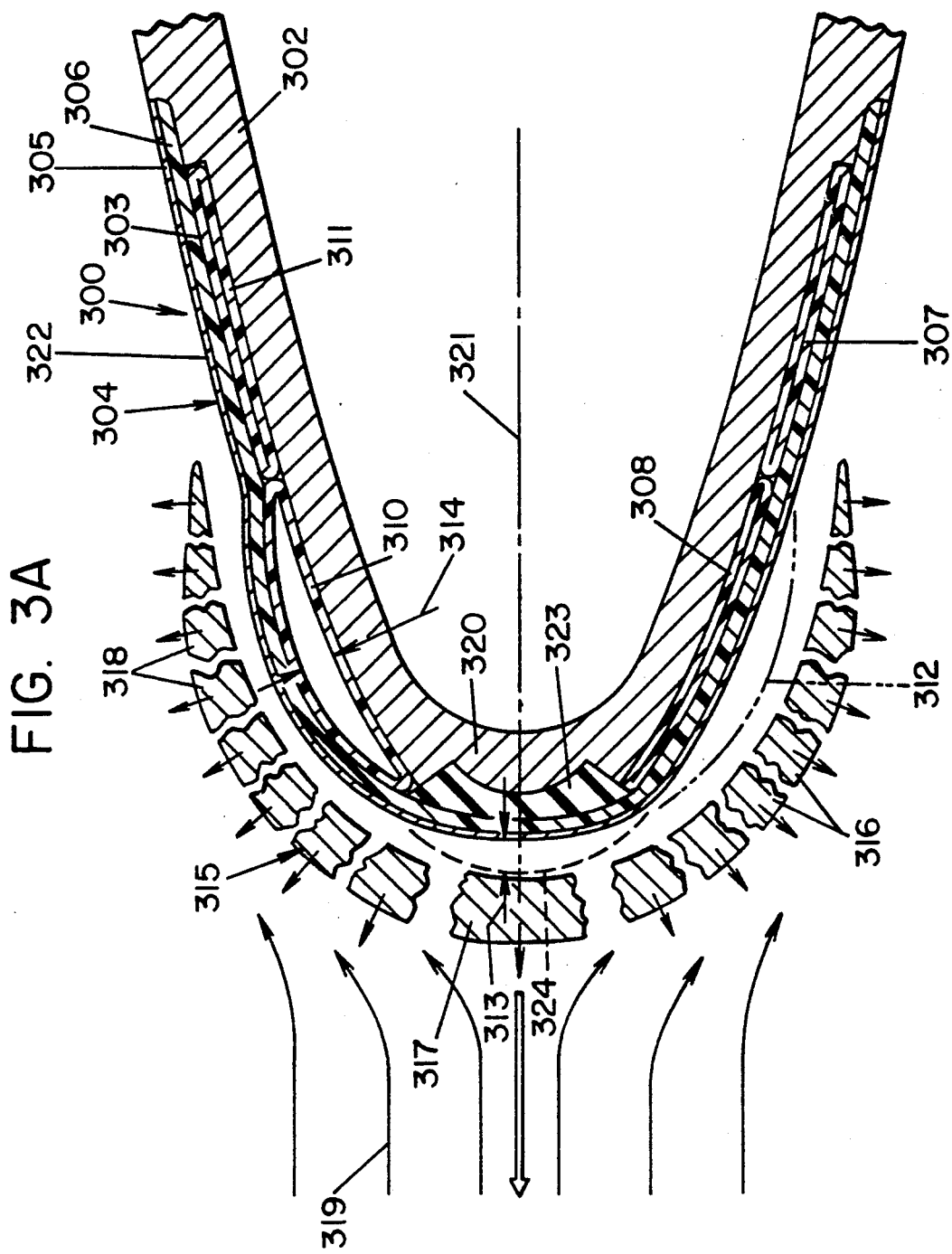
FIG. 3A is a fragmentary sectional view of a de-icer embodying the invention attached to a substructure, depicted in an activated state.

Referring now to FIG. 3A, de-icer 300 is shown in an activated state by inflation of tube 310. Components having the same numbers in FIGS. 3 and 3A are equivalent. Tubes 307, 308 and 311 are shown not inflated. The rest position of the skin 304 over the compressible member 323 is shown as a dashed line 324. The deflected profile of skin 304 induced during subsequent inflation of tube 308 is shown as a phantom line 312.

Rapid inflation of tube 310 deflects a first area of the skin 304 outward developing tension in skin 304. The skin 304 transfers tension to a second area of the skin 304 which compresses the compressible member 323, allowing the second area of skin 304 over the compressible member 323 to move inward. This movement must occur rapidly enough to debond and shatter the ice cap 315 and eject the side ice-pieces 318 into the impinging airstream 319 where they are swept away from the de-icer 300. The compressed air is subsequently vented from tube 310, and the skin 304 snaps back to its rest position due to the elastic properties of the skin 304 and compressible member 323. The process is repeated by inflation of tube 308 resulting in removal of side ice-pieces 316. The skin 304 over the compressible member 323 moves inward upon inflation of any of the tubes 307-311, thereby generating maximum compression 313.

A nose ice-piece 317 is removed during this sequence. Nose ice-piece 317 may be removed by two mechanisms. During the first part of the deflection, skin 304 is rapidly accelerated inward away from the ice-piece 317. This rapid acceleration may develop a gap between the skin 304 and the ice-piece 317, or may move the ice-piece 317 just enough to allow the airflow 319 to sweep the ice piece 317 away from the de-icer 300. However, this movement may not be sufficient to remove ice-piece 317 and the airstream 319 may force the ice-piece 317 to move inward with the skin 304. During the second part of the deflection, skin 304 may eject the ice-piece 317 into airstream 319 when it snaps back to its rest position 324. Regardless of the exact mechanism responsible for ice removal, the invention has been found to be very effective in removing ice over the apex 320. Also, ice removal over the apex 320 is enhanced since the skin 304 over the compressible member 323 is deflected each time one of the tubes 307-311 is inflated.

Figure 2:
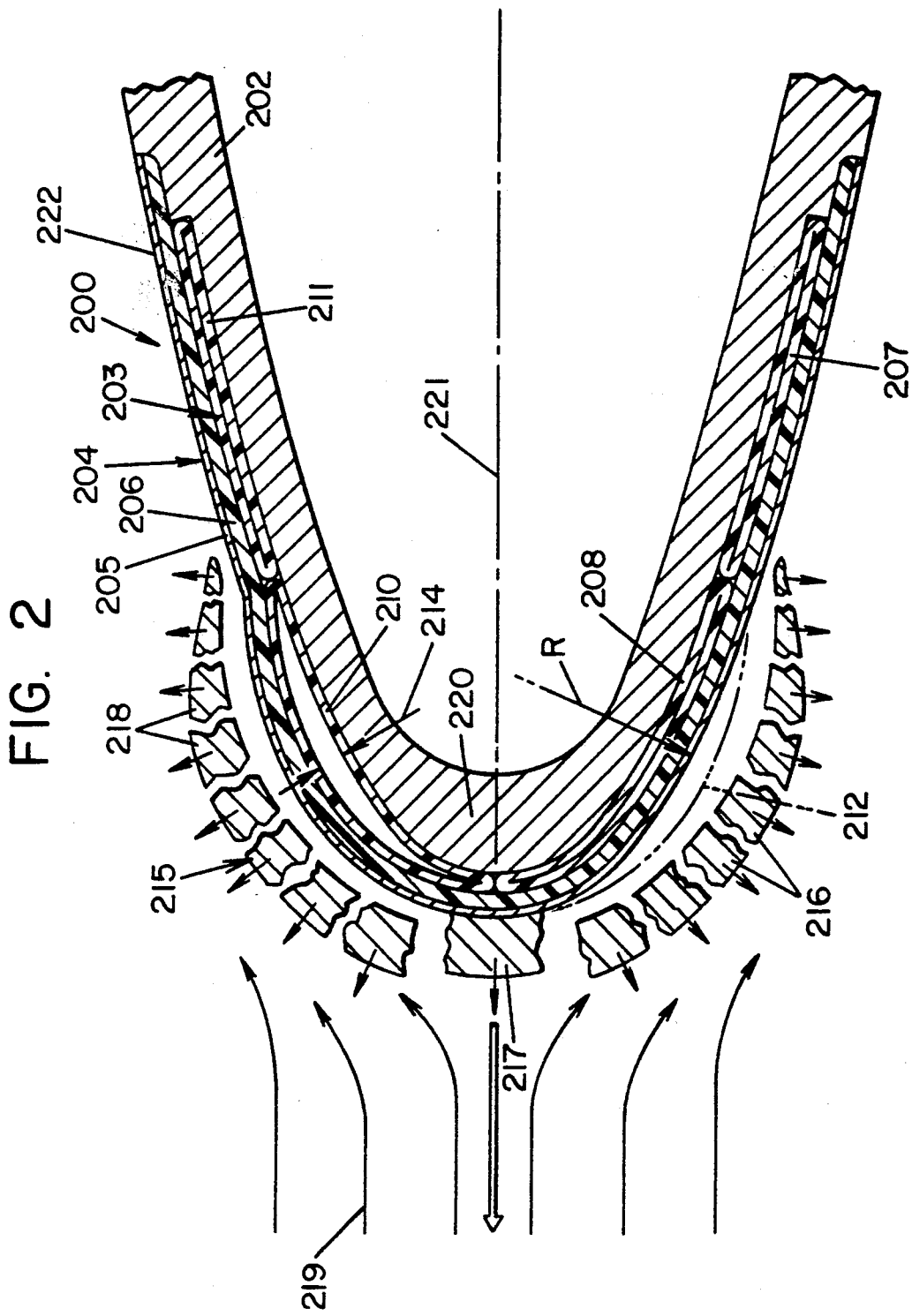
FIG. 2 is a fragmentary sectional view of a certain de-icer in the art attached to a substructure.

By comparing de-icer 300 with de-icer 100 of FIG. 1 and de-icer 200 of FIG. 2, a principal advantage of the invention can now be appreciated. As discussed previously, the energy consumption of a dynamic mechanical de-icer is proportional to the surface area of the skin deflection means 303 immediately subjacent the skin 304. Referring to de-icer 300, the surface area of the skin deflection means 303 is less than the active area. The area over the compressible member makes up the difference. Therefore, de-icer 300 consumes less energy than de-icers 100 or 200. Reducing the surface area of the skin deflection means 303 also reduces weight because the materials that form the skin deflection means 303 are generally more massive than the materials that form the compressible member 323.

In addition to reducing energy consumption and weight, the invention also improves the life of a dynamic de-icer. As discussed previously, achieving deflection in the skin of a deicer similar to de-icers 100 or 200 of FIGS. 1 and 2 can only be achieved by stretching the skin. In contrast, de-icer 300 of FIG. 1 achieves deflection of the skin 304 by two mechanisms; (1) stretching the skin 304, and (2) compressing the compressible member 323. Referring now to de-icer 300 of FIG. 3A, a certain maximum deflection 314 is necessary in order to achieve ice removal. The maximum deflection 314 depends on the materials and application, but generally ranges from 0.020 inch to 0.060 inch. The maximum deflection 314 of skin 304 over tube 310 is directly related to the maximum compression 313 of the compressible member 323. Decreasing the modulus of elasticity of the compressible member 323 increases maximum compression 313 and the maximum deflection 314 for a fixed level of force generation in the skin deflection means 303. Looking at the relationship another way, decreasing the modulus of elasticity of the compressible member 323 decreases the level of force generation in the skin deflection means 303 necessary to achieve a certain maximum deflection 314. The level of force generation in the skin deflection means 303 can be reduced, while still maintaining the maximum deflection 314, by choosing a material with an appropriate modulus of elasticity for the compressible member 323. Reducing the level of force generation in the skin deflection means 303 decreases the tension in skin 304. Stress in the skin deflection means 303 is reduced by decreasing the level of force generation. Likewise, stress in the skin 304 is reduced by reducing the level of tension. Therefore, the invention provides a means of reducing the stress levels in the components of a dynamic de-icer. As discussed previously, reducing the stress levels increases life. The superior life resulting from the invention has been demonstrated in several bench tests.

The decreased tension in skin 304 required to obtain a desired deflection also improves energy consumption and weight. As mentioned previously, the invention decreases stress in skin 304 and permits decreased force generation in the skin deflection means 303. Since less force is required, less material is required to absorb and distribute reaction forces from the skin deflection means 303. The substructure 302, skin deflection means 303, and skin 304 can all be lighter in weight since the invention reduces the force each must withstand.

Since less force is required to deflect the skin 304, less energy is required to generate that force. For skin deflection means utilizing expandable tubes, lower peak tube pressures are required which decreases valve supply pressure. Lower supply pressure results in a lighter valve and solenoid, lighter supply lines and a lighter compressor. For thin force and displacement generation means utilizing electromechanical apparatus, the supply voltage and resulting current can be decreased. Decreasing the voltage and current requirements results in lighter supply lines, lighter switching hardware, and lighter energy storage devices.

Additional weight and energy savings are gained in a pneumatic impulse ice protector embodiment. Pneumatic impulse valves, of the type described in U.S. Pat. No. 4,878,647 PNEUMATIC IMPULSE VALVE AND SEPARATION SYSTEM, Putt et al., are spaced along the spanwise length of a expandable tube (pneumatic impulse tube). The distance between valves depends on the pulse propagation distance as previously discussed in relation to de-icers 100 and 200 of FIGS. 1 and 2. The pulse propagation distance of a de-icer similar to de-icers 100 or 200 is limited by the stiffness of the outer skin. The pulse propagation distance of de-icer 300 is greater because the skin 304 of de-icer 300 is easier to deflect. For example, if skin 304 is formed from 0.005 inch thick 15-3 titanium alloy, the pulse may generate effective ice removal about four feet on either side of a valve. Therefore, the distance between valves must be about eight feet in order to provide effective ice removal along the span of a tube. Two valves per tube would be required for a sixteen foot span. For an ice protector having a compressible member and five tubes, a total of only ten valves would be required. However, de-icer 300 presents a further advantage since its active area is the same as the active area of de-icer 100, but de-icer 300 has only four tubes. In other words, de-icer 300 would require only eight valves compared to the sixteen valves required by de-icer 100. In this hypothetical example, the number of valves has been reduced by one-half. Reducing the number of valves reduces energy consumption, weight, cost, and complexity of the system. Fewer valves also increases the reliability because the resulting system has many fewer mechanical components.

The invention also produces improvements in ice removal performance. In general, the ice removal performance of a dynamic de-icer is strongly related to how quickly the outer skin moves. As the movement rate of the surface increases, minimum ice removal thickness decreases along with the quantity of residual ice left after ice cap removal. In general, a surface frequency response of at least 2000 hertz and a deflection of at least 0.020 inches and a peak acceleration of at least 3000 g (1 g=32.2 f/s $^2$) is desirable. This application is filed in conjunction with copending and co-owned application Ser. No. 07/998,360 IMPROVED SKIN FOR A DE-ICER, Rauckhorst et al., filed Dec. 30, 1992, which is herein incorporated by reference (hereinafter referred to as the Improved Skin Application).

In general, the dynamic frequency response of a thin deflectable skin is increased by increasing its modulus of elasticity. Materials having an elevated modulus of elasticity and a tendency to transmit rather than damp dynamic motion are preferred. For the purposes of this application, an "elevated modulus" means a modulus of elasticity greater than 40,000 kPa. Examples of desirable materials for the backing layer 306 include but are not limited to fiber reinforced plastics which are preferred over natural or synthetic rubbers. Fiberglass or carbon fiber reinforced nitrile phenolic or epoxy are particularly useful. Materials having less of a tendency to absorb and damp dynamic movement are also desirable in order to minimize the amount of impulse energy absorbed by the backing layer 306. As much of the impulse energy as possible should be transmitted to the ice layer. Kevlar ® (aramid fiber) generally is not desirable because of its tendency to absorb and damp the dynamic motion induced by the skin deflection means.

As a part of the skin, mechanical properties of the layer of erosion resistant material also perform an important role in the ice removal performance of dynamic de-icers. In particular, materials having an elevated modulus of elasticity and a tendency to transmit rather than damp dynamic motion exhibit the best ice removal properties. Examples of such materials include plastic films, such as polyurethane or polyether-ether-ketone and metal foils such as titanium, aluminum, or stainless steel. These materials generally perform better than low modulus materials such as natural or synthetic rubber, and polyurethane elastomer. These materials exhibit better ice removal performance for two reasons. First, they generally have less of a tendency to absorb and damp the dynamic motion induced by the skin deflection means. Dynamic energy tends to be absorbed and dissipated in a low modulus erosion layer rather than being efficiently transmitted to the ice layer. Second, ice removal is partially achieved by changing the surface curvature to develop shear stresses along the adhesion line at the interface of the ice cap and the erosion layer. These shear stresses contribute to destroying the adhesion along the interface, thereby releasing the ice cap to be ejected from the de-icer surface. Low modulus materials tend to distribute and dissipate the shear stresses along the interface. Elevated modulus materials tend to concentrate shear stresses along the interface. Examples of suitable materials include metal foils, such as titanium, or plastic films, such as polyether-ether-ketone or polyurethane. Because of these effects, a de-icer with a low modulus surface generally leaves more residual ice, and cannot remove thicknesses of ice as thin as a de-icer having an elevated modulus surface.

Another important advantage of the invention can now be appreciated. The preceding discussion emphasizes that, for the best ice removal performance, the skin materials should be selected from a group of materials having an elevated modulus and a tendency to transmit rather than damp dynamic motion. As discussed previously, deflection of a high modulus skin requires more force with a de-icer similar to de-icers 100 or 200 than with a de-icer similar to de-icer 300 having a compressible member 323. Decreasing the force increases the life of a dynamic de-icer. Therefore, de-icer 300 permits use of an elevated modulus skin 304, and the attendant ice removal performance, while maintaining lower stress levels and a longer life.

Though not fully explored, the compressible member 323 also effects the dynamic response of the skin 304. The damping qualities of some materials may prove to be undesirable. Increasing the modulus of the compressible member material should increase the frequency response of the skin 304. However, increasing the modulus also increases the force required to achieve a desired deflection of skin 304 which affects life. Life and ice removal performance must always be balanced. The upper limit for the durometer of the compressible member should be about a Shore D 70, but preferably less than Shore A 90. A strip of chlorobutyl rubber having a Shore A durometer within the range from about 55 to 65 is particularly useful, especially when combined with a carbon or glass fiber reinforced nitrile phenolic skin 304. An outer skin of fabric reinforced Neoprene is also useful in combination with a butyl rubber compressible member. The width of the compressible member 323 depends on the application, but would probably fall between ¼ inch and 2 inches for most applications. The thickness is preferably less than 0.100 inch and a thickness as low as 0.050 inch may prove satisfactory for many applications. A thinner compressible member is preferable because it weighs less and is easier to manufacture.

As discussed previously, ice removal over the apex of de-icers 100 and 200 may prove unsatisfactory depending on the geometry. Specifically, removing ice over an apex from a surface having a radius of curvature less than 0.50 inch can be difficult. Removing ice over an apex having a radius of curvature less than 0.25 inch is particularly difficult. As evidenced by de-icer 300, the invention provides a means whereby the ice removal over an apex is improved. The increased action in skin 304 over the compressible member 323 greatly improves ice removal over the apex, which is especially useful with surface geometries having a small radius of curvature.

Figure 3B:
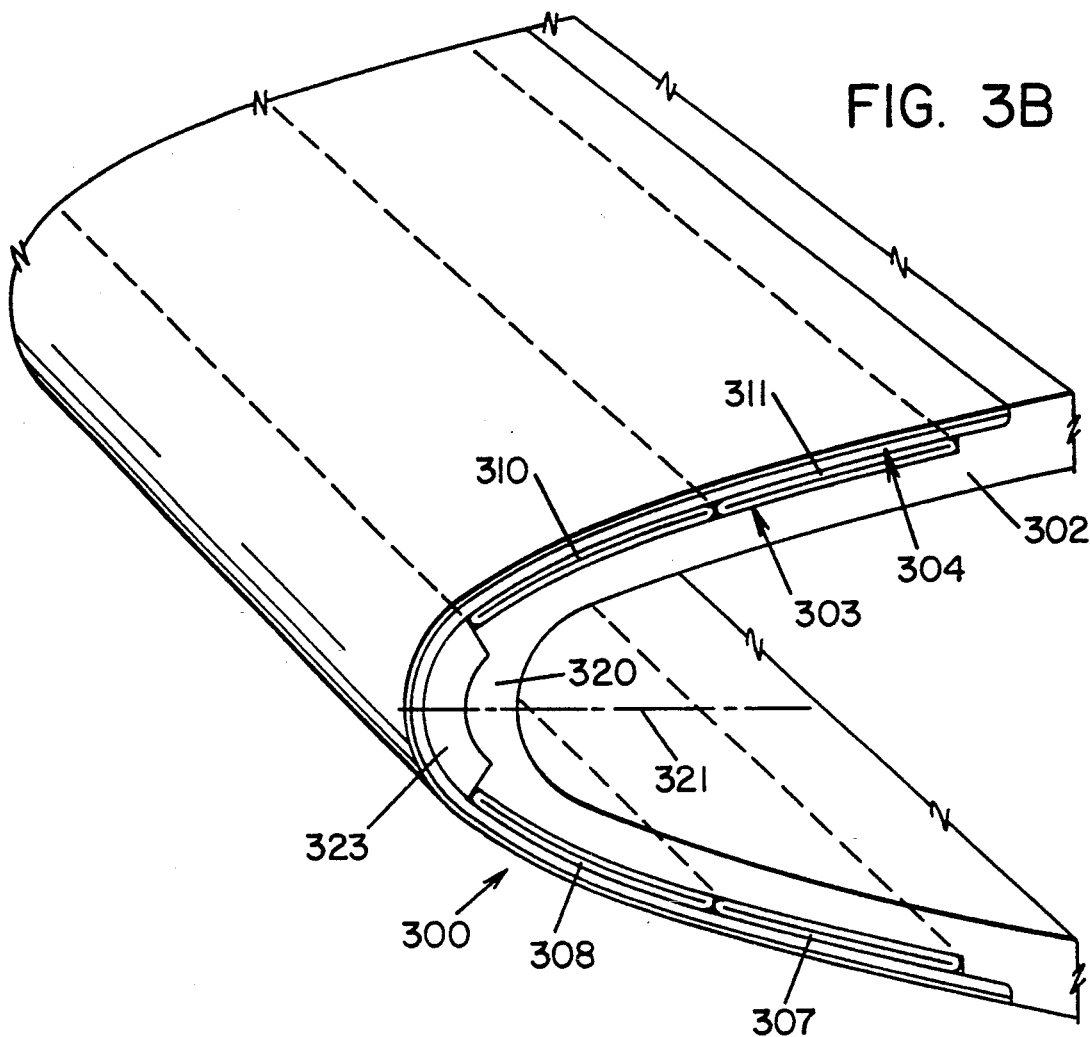
FIG. 3B is an isometric view of the de-icer of FIG. 3.
Figure 3C:
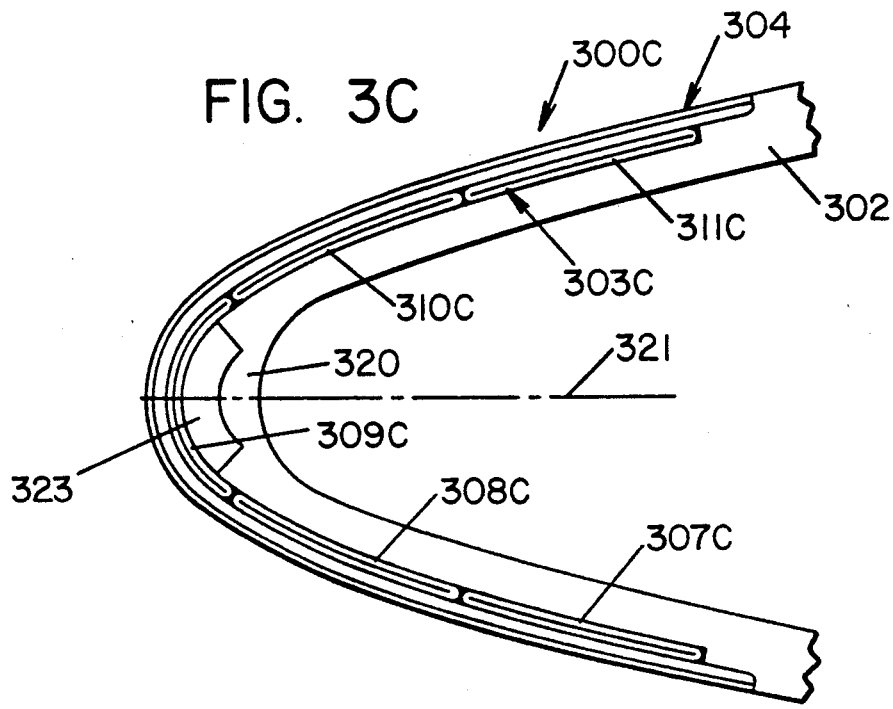
FIG. 3C is a fragmentary sectional view of an alternate embodiment of the de-icer of FIG. 3B.
Figure 3D:
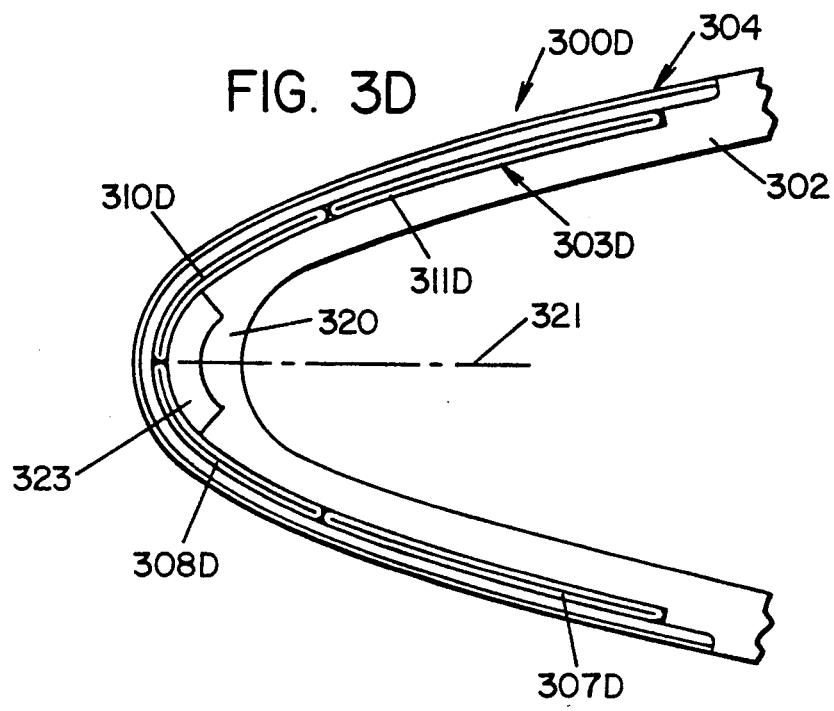
FIG. 3D is a fragmentary sectional view of an alternate embodiment of the de-icer of FIG. 3B.

Referring now to FIGS. 3B through 3D, different tube and compressible member arrangements are presented and may be desirable depending on the application. Like numbered components in FIGS. 3 through 3D are equivalent. Referring to de-icer 300 of FIG. 3, the skin deflection means 303 are divided by the compressible member 323 and overly the substructure extending from either side of the apex 320. Tubes 307 and 308 overlie the substructure 302 abutting each other along one edge. One edge of tube 308 abuts the compressible member 323. Tubes 310 and 311 are arranged similarly overlying the opposing portion of the substructure 302. Tubes 307-311 extend in the spanwise direction beneath the skin 304.

Referring to FIG. 3C, de-icer 300C has skin deflection means 303C composed of tubes 307C-311C. Here, the skin deflection means 303C overlie the compressible member 323. Tube 309C overlies the compressible member 323 and tubes 307C and 308C overly the substructure abutting each other along one edge. Tube 308C abuts tube 309C along one edge. Tubes 310C and 311C are similarly arranged overlying the opposing portion of substructure 302. Tubes 307C-311C extend in the spanwise direction beneath the skin 304. This arrangement may be useful if ice removal over the apex 323 is not entirely satisfactory with de-icer 300 of FIG. 3B. De-icer 300C will probably consume more energy than de-icer 300 because the skin deflection means 303C have a larger surface area than skin deflection means 303. However, other advantages of the invention relating to energy consumption, weight, cost and reliability can still be realized.

Tube 309C could also be positioned between the substructure 302 and the compressible member 323. The compressible member 323 would then be in direct contact with the skin 304. This arrangement (not shown) is believed to be less desirable because dynamic motion induced by tube 309C would pass through the compressible member 323 before reaching the skin 304. The compressible member 323 would probably absorb much of the dynamic motion before reaching the skin 304 resulting in decreased ice removal effectiveness.

In FIG. 3D, de-icer 300D represents another arrangement where the skin deflection means overlie the apex. Skin deflection means 303D is comprised of expandable tubes 307D-311D. Tubes 308D and 310D abut along one edge directly over the apex 320. Tubes 307D and 308D abut each other along one edge. Tubes 311D and 310D are similarly arranged overlying the opposing portion of the substructure 302. Tubes 307D-311D extend in the spanwise direction beneath the skin 304. This arrangement may also be desirable if ice removal performance of de-icer 300 of FIG. 3B is not entirely satisfactory. De-icer 300D will probably consume more energy than de-icer 300 because the skin deflection means have a larger surface area. Once again, however, other advantages of the invention relating to energy consumption, weight, cost and reliability can still be realized.

The best tube and compressible member arrangement depends on a variety of factors that can vary greatly depending on an airframe manufacturer's specifications. Such factors include, the leading edge geometry, flight characteristics, maximum thickness of ice that can be tolerated, cost, life, reliability and weight. An arrangement similar to de-icer 300 is most desirable. However, depending on the application, ice removal performance over the apex may require use of arrangements similar to de-icers 300C or 300D. Optimizing the design is a process that iterates between bench testing and icing wind tunnel testing. Life tests, rain erosion tests, dynamic tests and icing wind tunnel tests are cyclically performed with an eye toward improving each property. Changing the design to improve one of these factors may have an adverse effect on another. The rain erosion test parameters described in the Integrated Pneumatic Impulse Patent are particularly useful for determining rain erosion characteristics. Dynamic tests can be considered as a subset of icing wind tunnel tests since improving skin dynamics usually improves ice removal performance. A Polytech Model No. OFV 300 laser vibrometer system has been found to be very effective for bench testing designs in order to determine dynamic displacements, velocities, and accelerations at various locations on the skin. In general, a peak skin acceleration of at least 3000 g's (1 g=32.2 f/sec$^2$) at a peak frequency of at least 2000 hertz with a peak deflection of 0.020 inch is desirable. Much greater accelerations may be necessary depending on ice removal requirements.

Figure 4:
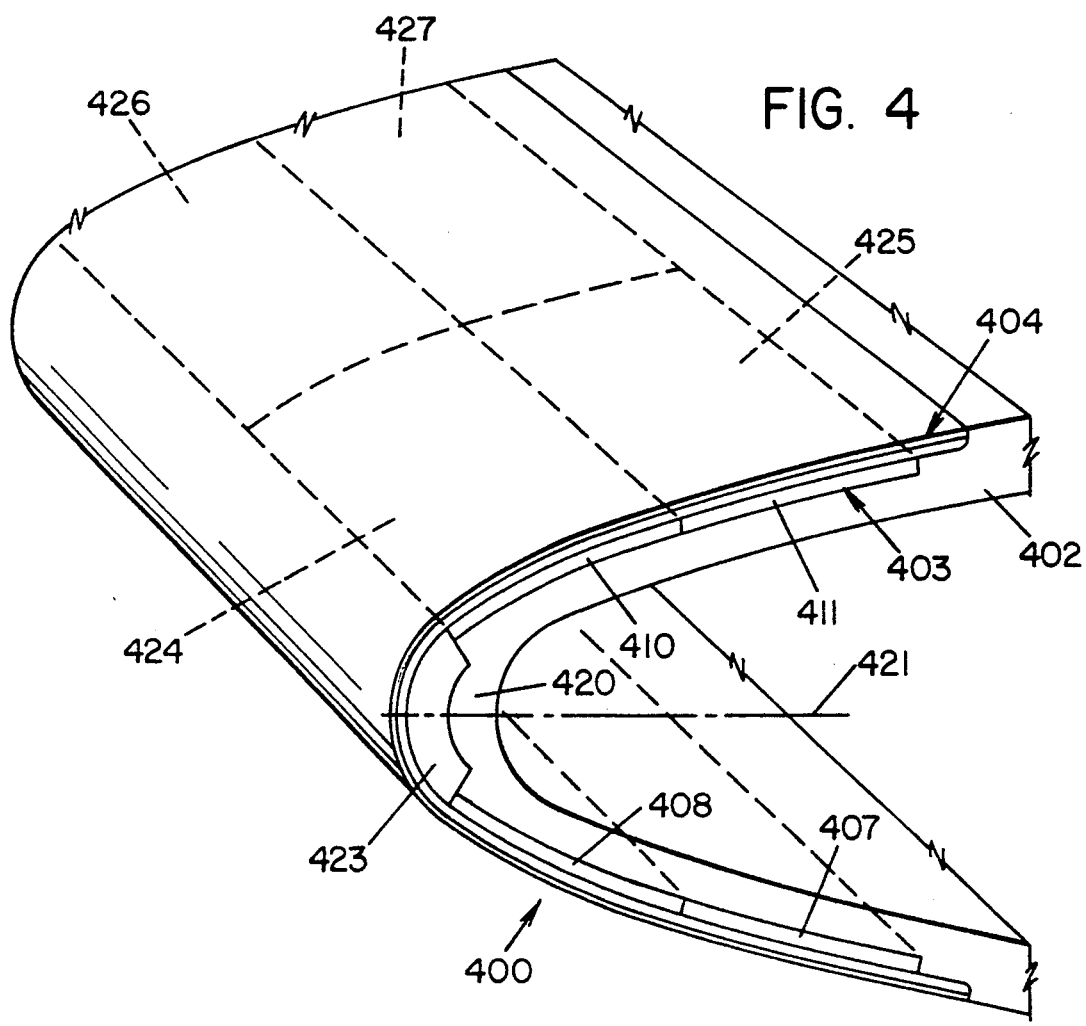
FIG. 4 is an isometric view of a de-icer incorporating electromagnetic apparatus attached to a substructure.
Figure 4A:
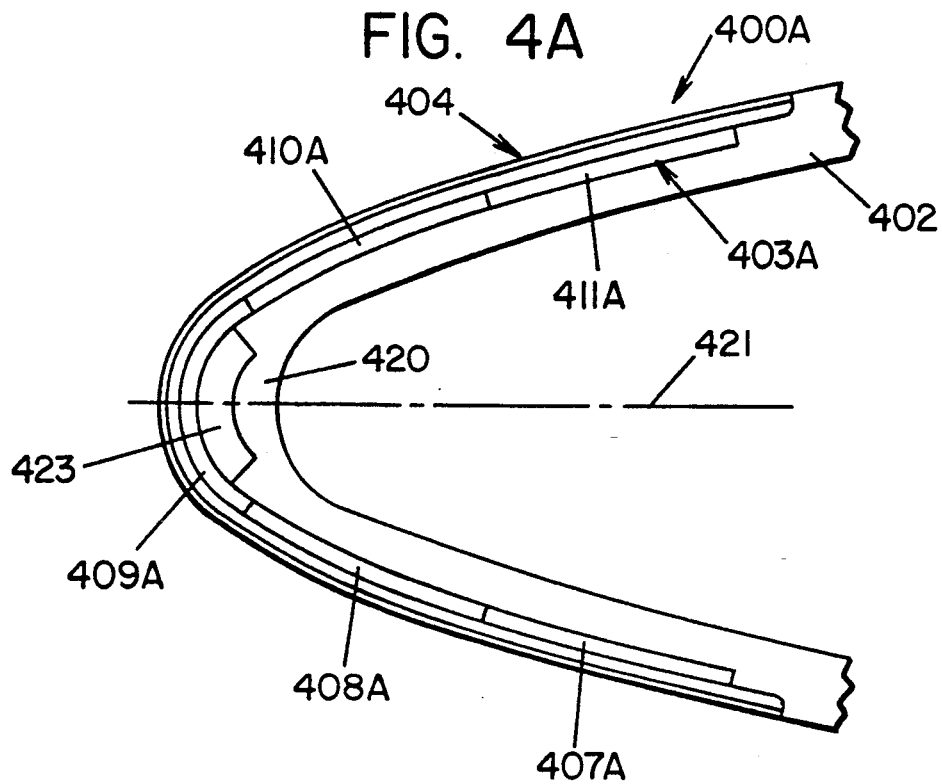
FIG. 4A is a fragmentary sectional view of an alternate embodiment of the de-icer of FIG. 4.
Figure 4B:
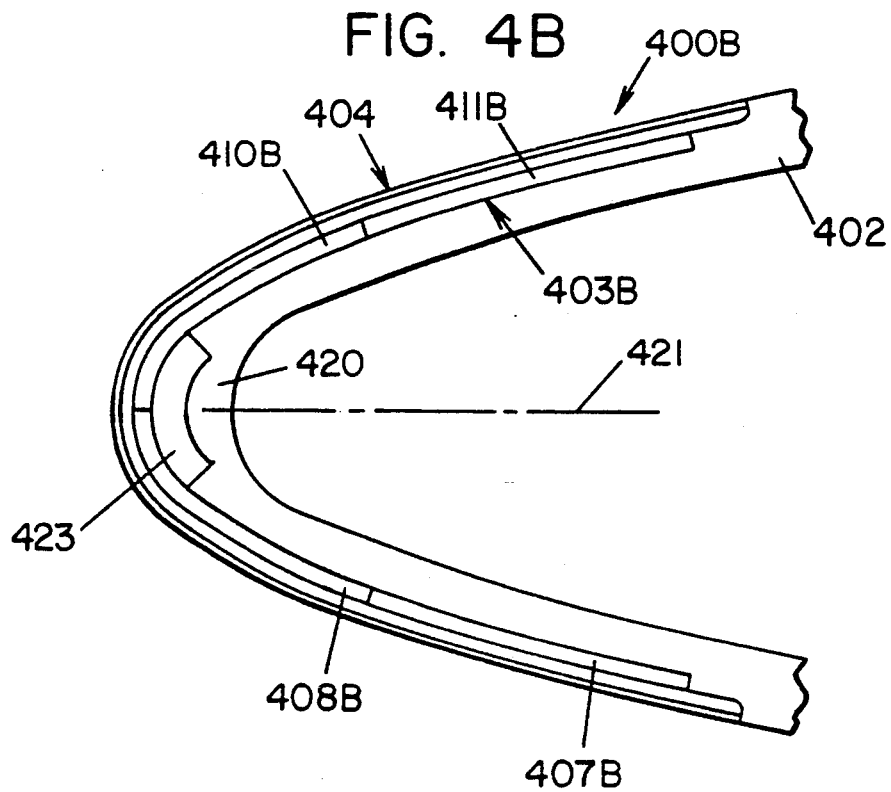
FIG. 4B is a fragmentary sectional view of an alternate embodiment of the de-icer of FIG. 4.

FIGS. 4 through 4B present similar arrangements, but the thin skin deflection means incorporate electromagnetic apparatus. Examples of two types of electromagnetic apparatus that can be employed as skin deflection means are presented in FIGS. 5 and 6. These are intended to be viewed only as examples of the different types of skin deflection means that can be used in combination with the claimed invention. The types of structures that can be used in the practice of the claimed invention are not limited to the examples shown.

Figure 5:
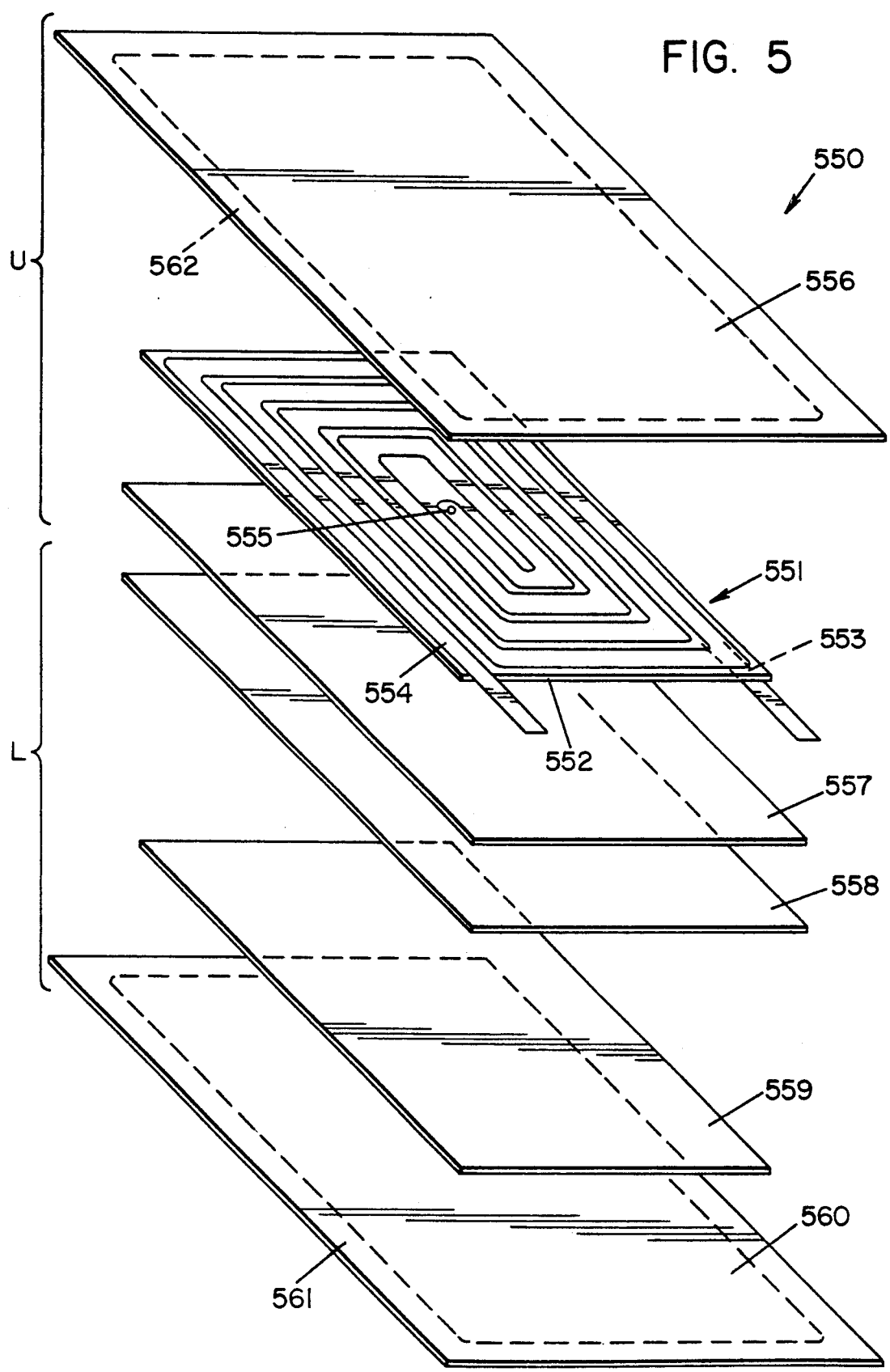
FIG. 5 is an exploded isometric view of an electro-impulse embodiment for a skin deflection means.

The electromagnetic apparatus of FIG. 5 comprises an eddy current separation assembly 550. Eddy current separation assembly 550 includes a planar coil 551, an upper dielectric layer 556, a coil dielectric layer 557, a target dielectric layer 558, a target 559, and a lower dielectric layer 560. The planar coil 551 includes two coil members 553 and 554 disposed on the opposite sides of a dielectric carrier 552. The coil members 553 and 554 are mirror images of each other as described in the Planar Coil Patent. An electrical connection 555 is provided at the center which electrically connects the two coils. A small copper rivet has been found useful in forming electrical connection 555, but a weld is more preferable. The coil members 553 and 554 are most preferably formed from etched copper foil, but other materials may be used as described in the Planar Coil Patent. The dielectric carrier 552 can be formed from any material having good mechanical and dielectric properties such as plastics, fiber reinforced plastics, and synthetic rubbers.

Planar coil 551 is encapsulated between upper dielectric layer 556 and coil dielectric layer 557. The target 559 is encapsulated between target dielectric layer 558 and lower dielectric layer 560. The upper dielectric layer 556, coil 551, and coil dielectric layer 557 together form an upper member indicated by the letter U. The lower dielectric layer 560, target 559, and target dielectric layer 558 together form a lower member indicated by the letter L. The upper member U and lower member L are joined along an upper bond perimeter 562 and lower bond perimeter 561 forming a assembly.

The target 559 is superposed next to the coil 551. Electrical leads (not shown) are attached to the coil members 553 and 554 and are also encapsulated between upper and lower dielectric layers 556 and 560. Target 559 is formed from conductive material such as copper or aluminum sheet. The various dielectric layers are formed from materials having good dielectric and mechanical properties. Examples of such materials are plastics, reinforced plastics, and synthetic rubbers.

Upon application of a large magnitude transient potential to the coil 551, a large magnitude transient current is generated in the coil and eddy currents are formed in the target 559. The upper member U is forcefully repulsed from the lower member L. The upper member U is not bonded to the lower member L in the area between the coil 551 and target 559 thereby permitting movement. The active area is roughly defined by the area of the target 559 or planar coil 551. Apparatus for achieving a shaped large magnitude current pulse is presented in the Planar Coil Patent.

Figure 6:
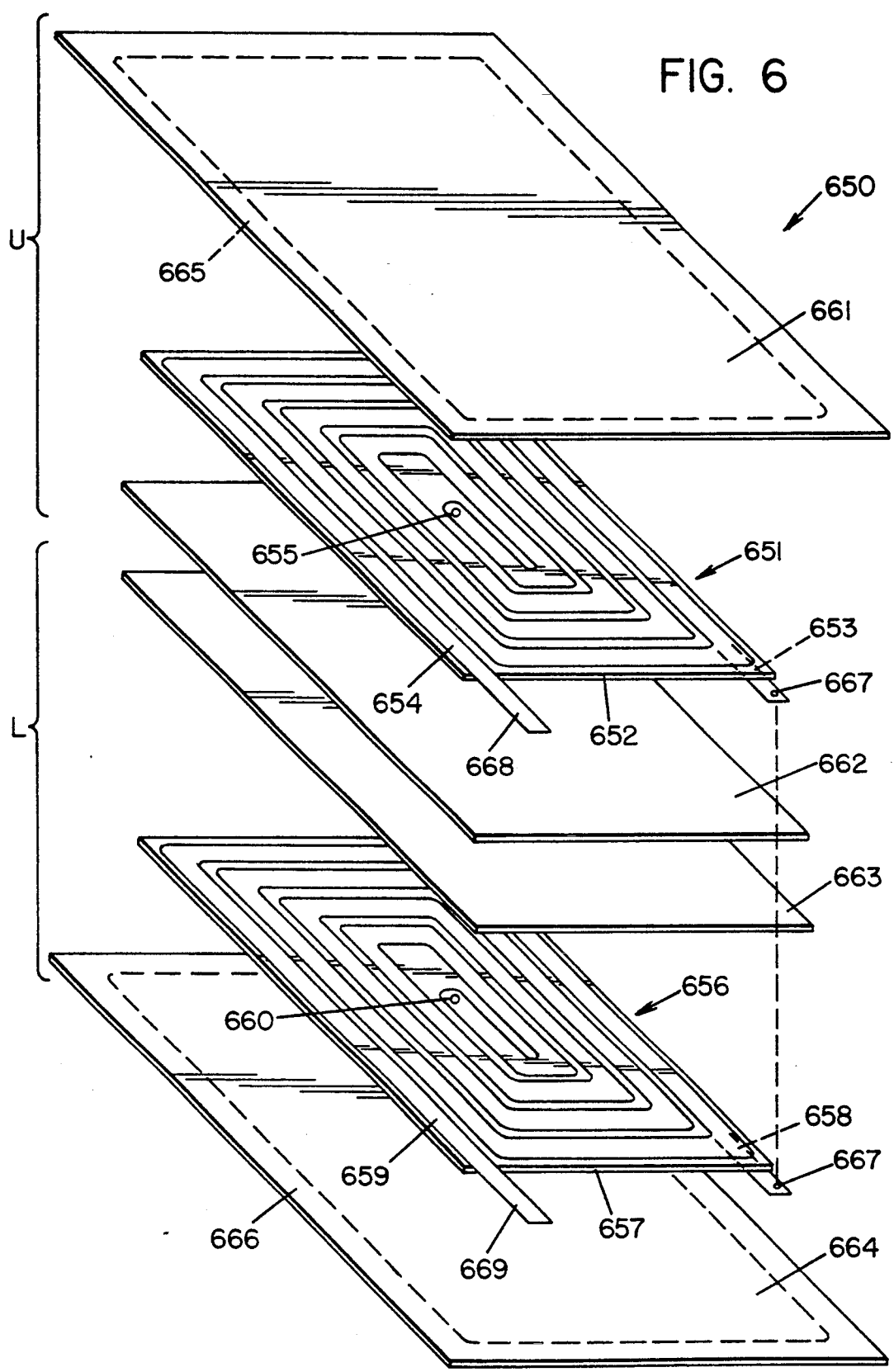
FIG. 6 is an exploded isometric view of an electro-repulsive embodiment for a skin deflection means.

The electromagnetic apparatus of FIG. 6 comprises electro-repulsive separation assembly 650. Upper coil 651 is composed of two coil members 653 and 654 disposed on opposite sides of a dielectric carrier 652. The coil members 653 and 654 are arranged the same as coil members 553 and 554 of planar coil 551. Electrical connection 655 connects the ends of the coil member 654 and 653 through the dielectric layer at the center. Lower planar coil 656 is composed of two coil members 658 and 659 disposed on opposite sides of a dielectric carrier 657. Planar coil 656 is identical to planar coil 651. Electrical connection 660 connects the ends of the coil members 658 and 659 through the dielectric layer at the center. A small copper rivet has been found to be useful for this purpose, but a weld is preferred.

Upper planar coil 651 is encapsulated in an upper dielectric layer 661 and an upper coil dielectric layer 662 thereby forming an upper member U. Lower planar coil is encapsulated in a lower dielectric layer 664 and lower coil dielectric layer 663 thereby forming a lower member L. The upper and lower members U and L are joined at the upper and lower bond perimeters 665 and 666 which forms the separation assembly 650. The upper coil 651 is superposed over the lower coil 651 such that the conductors in each are substantially aligned. The upper member U and lower member L are not bonded together in the area between the coils 651 and 656. An electrical connection 667 is formed between the ribbon lead extending from coil member 653 and the ribbon lead extending from coil member 658. The connection is shown as a dashed line because FIG. 6 is an exploded view and the ribbon leads are actually adjacent to each other. Separate electrical leads (not shown) are electrically connected (not shown) to an upper coil lead 668 and a lower coil lead 669. The electrical connections are encapsulated in the upper and lower dielectric layers 661 and 664.

During operation, a high magnitude transient potential is applied across the leads 668 and 669. The potential induces a high magnitude transient current, in the coils 651 and 656. The current direction in any conductor of the upper coil members 653 or 654 will be substantially opposite to the current direction in the adjacent conductor of the lower coil members 658 or 659. Because the current direction is opposite, the upper coil members 653 and 654 forcefully repel the lower coil members 658 and 659. The upper member U is thereby forcefully repelled and displaced from the lower member L. The active area of the separation assembly is defined by the area of the planar coils 651 and 656.

The coils depicted in FIGS. 5 and 6 have been referred to as "planar" coils. The term "planar" is intended to refer only to the thin sheet-like qualities of the coil as described in the planar coil patent. The coils depicted in FIGS. 5 and 6 could be formed to a curved surface if they are constructed of sufficiently flexible materials. If the materials are not sufficiently flexible, the coils could be cured to shape under heat and pressure in a mold or press.

Returning now to FIGS. 4 through 4B, various arrangements are presented that use skin deflection means comprising electromagnetic apparatus, wherein like numbered components are equivalent. The electro-repulsive separation assembly 650 and eddy current separation assembly 550 are examples of such apparatus. Since the active area of any separation assembly is roughly defined by the area of the coil, several separation assemblies must be disposed spaced along the span of the de-icer. The active area of each separation assembly roughly defines a segment.

In FIG. 4, a de-icer 400 is shown attached to a substructure 402. De-icer 400 is comprised of a skin 404, skin deflection means 403, and a compressible member 423. The substructure 402 and de-icer have an apex 420 and are bisected by a centerline 421. The skin deflection means 403 of de-icer 400 is comprised of several separation assemblies spaced along the span of de-icer 400 underlying the skin 404. This feature is different than previous embodiments using expandable tubes because tubes can easily run the length of a span whereas coils are more confined in their extent. Larger coils inherently have a larger electrical resistance which results lower peak current and lower separation force. The active area of each separation assembly is defined by segments 424–427. Segments are similarly defined overlying the opposing portion of substructure 402 which are not in view as presented in FIG. 4. Separation assemblies 407–411 are spaced around the substructure 402 in the chordwise direction. Separation assemblies 411 and 410 abut along one edge of each separation assembly. Separation assembly 410 (and the coil within) abuts the compressible member 423 along one edge. Separation assemblies 407 and 408 are similarly arranged overlying the opposing portion of substructure 402.

In operation, a high magnitude current pulse is applied sequentially to the leads of each separation assembly. As previously discussed, the upper member U and lower member L, as shown in FIGS. 5 and 6, are forcefully repelled away from each other. The substructure 402 resists the reaction from one of the members. The other member forces the skin 404 away from the substructure 402. The resulting deflection of the skin 404 is quite similar to that presented in FIG. 3A. This action can be induced by either an eddy current separation assembly 550 or an electro-repulsive separation assembly 650.

Another arrangement is presented in FIG. 4A. De-icer 400A is attached to substructure 402. De-icer 400 is comprised of skin 404, skin deflection means 403A and compressible member 423. Skin deflection means 403A are similar to skin deflection means 403 except an additional separation assembly 409A overlies the apex 420. Separation assemblies 407A and 408A abut along one edge of each separation assembly. Separation assembly 408A abuts separation assembly 409A along one edge of each separation assembly. Separation assemblies 410A and 411A are similarly arranged overlying the opposing portion of substructure 402. Other separation assemblies (not shown) are distributed in the spanwise direction underlying the skin 404 forming segments (not shown) similar to de-icer 400. This arrangement may be desirable if ice removal over the apex 423 of de-icer 400 is not satisfactory. Separation assembly 409A could be placed beneath the compressible member 423, but this would probably result in less effective ice removal.

Another arrangement is presented in FIG. 4B. De-icer 400B is attached to substructure 402. De-icer 400B is comprised of skin 404, skin deflection means 403B, and compressible member 423. Skin deflection means 403B is similar to skin deflection means 403 except separation assemblies 408B and 410B abut each other along one edge over the compressible member 423. Separation assembly 407B abuts separation assembly 408B along one edge. Likewise, separation assembly 410B abuts separation assembly 411B along one edge. As before, additional separation assemblies (not shown) are distributed in the spanwise direction which form several segments (not shown). De-icer 400B is another example of an arrangement that may be used if ice removal over the apex 423 of de-icer 400 is unsatisfactory.

Though discussed in terms of individual separation assemblies, comparing FIGS. 5 and 6 with FIGS. 4 through 4B suggests that several separation assemblies could be formed into a single unitary blanket. For example, the four separation assemblies underlying the four segments of de-icer 400 as shown in FIG. 4 could be combined into a single blanket. Referring to FIG. 5, four coils could be distributed in side-by-side relationship between a single upper dielectric layer 556 and single coil dielectric layer 557. A single target 559 large enough to underlie all four coils 551 could be encapsulated between a single lower dielectric layer 560 and target dielectric layer 558. If this were done, the bond perimeters 562 and 561 would run around the perimeter defined by all four elements. The same applies to FIG. 6. Four sets of planar coils 651 and 656 could be distributed in side-by-side relationship between the upper dielectric layer 661 and lower dielectric layer 664 thereby forming a single unitary blanket. In either case, the segments 424–427 of de-icer 400 would still be defined by the active area of each coil within each separation assembly.

Other variations not specifically presented are also considered to be within the purview of this invention. For example, the target 559 of FIG. 5 may not be required if the substructure is sufficiently conductive. In this case, the thin force and displacement generation means would constitute only the upper member U of FIG. 5. Several upper members could be consolidated into a single blanket as discussed above. Also, the compressible member has consistently been shown centered on the apex. It could be shifted away from the apex in the chordwise direction as long as a portion of the compressible member still overlies the apex. Shifting the compressible member may be desirable depending on the geometry. Referring to FIGS. 3D and 4B, the pneumatic tubes or separation assemblies abut over the apex along the centerline. The edge along which they abut could be shifted to one side of the centerline. Finally, in all of the embodiments disclosed thus far, the active area has been symmetric with respect to the centerline. Depending on the application, the active area could be shifted so that active area overlying one portion of the substructure is greater than the active area overlying the opposing portion. Also, the geometry of the substructure and de-icer has been depicted as symmetric about the centerline. In most applications, the active area and leading edge geometry will not be symmetric about the centerline.

BEST MODE

Figure 7:
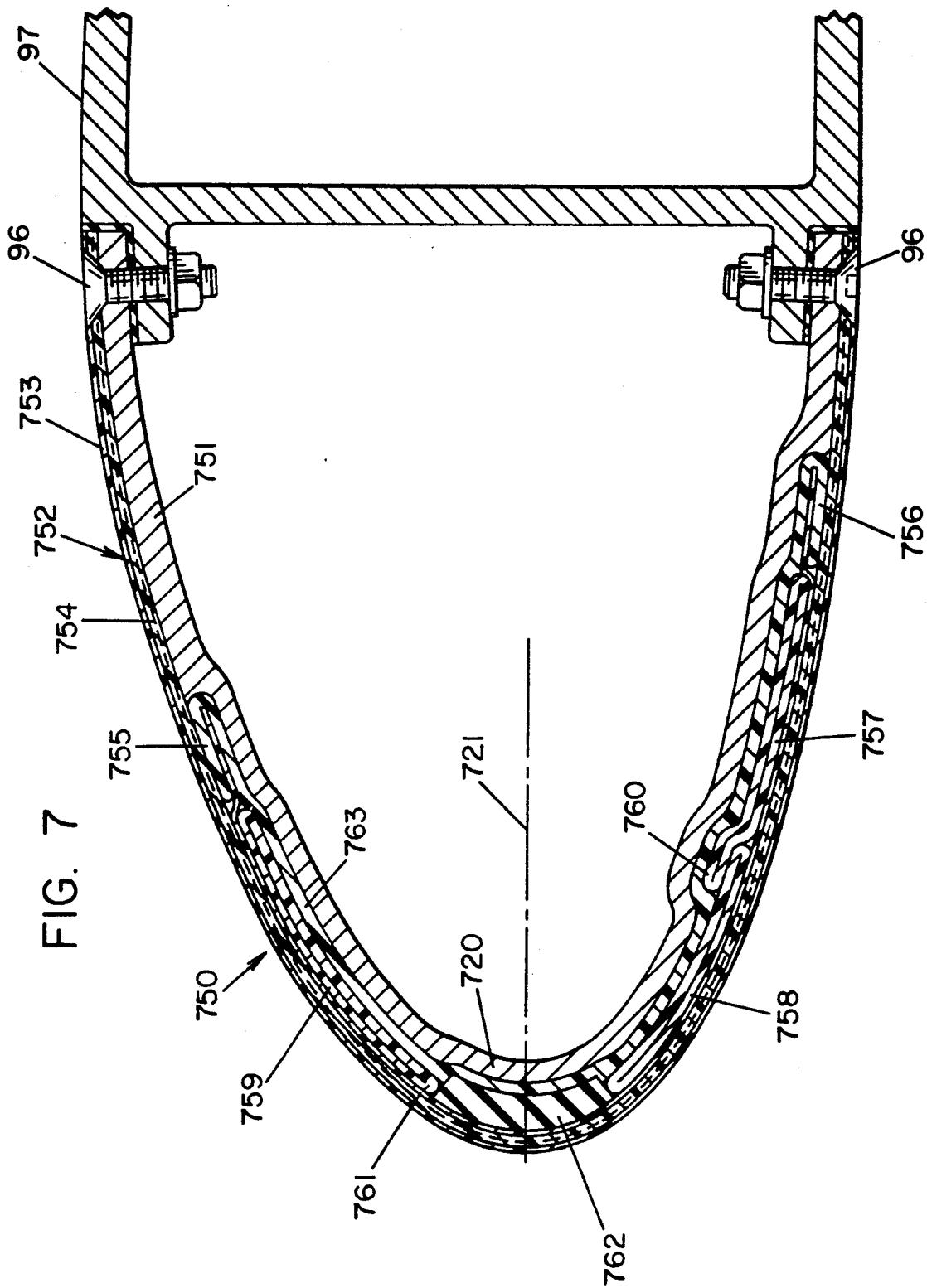
FIG. 7 is a fragmentary sectional view of a best mode de-icer for a low speed general aviation aircraft.

A preferred mode of practicing the invention is presented in FIG. 7. This mode is preferred for use on the fixed leading edge surfaces of a relatively low speed (250 Knot max flight speed) aircraft, particularly the leading edges of the wing, horizontal stabilizer, and vertical stabilizer. A De-icer 750 and a substructure 751 are permanently bonded together and are shown attached to an aircraft structure 97 by fasteners 96. De-icer 750 and substructure 751 have an apex 720 and are bisected by a centerline 721.

A deflectable skin 752 is composed of an erosion layer 753 and a backing layer 754. The backing layer 754 is selectively stiffened as described in the Improved Skin Application. Three tubes 757, 758 and 759 extend in the spanwise direction beneath the skin 752. Tube 759 on the upper surface abuts the compressible member 762 along one edge and tube 758 abuts the compressible member 762 along one edge. A marginal member along each edge of tubes 757 and 758 form an overlap 760 as described in copending application Ser. No. 07/832,472 AIRFOIL WITH INTEGRAL DE-ICER USING OVERLAPPED TUBES, Rauckhorst et al. which is fully incorporated herein by reference. The skin 752 is joined to the substructure 751 by peel tabs 755 and 756 which are folded over extensions of a tube assembly back ply 763. Release layer 761 extends from the upper peel tab 755 to the lower peel tab 756. The release layer 761 forms an unbonded member between the skin 752 and underlying tubes 757, 758 and 759 and compressible member 762.

Matching male and female tools are required to build de-icer 750. The process begins by fabricating the backing layer 754. The male tool is treated with release and a single layer of 3M AF32 nitrile phenolic film adhesive is applied to the surface of tool. A layer of dry Ceiba-Geigy CGG300 graphite fabric is then laid over the tool and manually conformed to the shape of the tool. The fabric should be placed on an angle in relation to the chordwise direction of the tool. An angle of 45° is preferred but may not be possible unless the fabric prewoven at an angle of 45° relative to width. A single coat of BFGoodrich A-626-B is then applied which saturates and adheres the graphite fabric to the film adhesive. The graphite fabric is then covered with a layer of perforated release film which is conformed to the shape of the tool with no wrinkles. A preferable film is catalogue number A-5000 P3 (holes on ½ inch centers) produced by Richmond Aircraft Products, Inc. A vacuum bag is then applied and vacuum is applied for a minimum of 120 hours which impregnates the film adhesive into the graphite fabric. Following vacuum treatment, the vacuum bag and release film are removed and the impregnated graphite fabric is dried in open air for a minimum of 48 hours.

Following the drying period, the impregnated graphite fabric is removed from the male tool, placed in the female tool, and cured under vacuum at 350° F. under 70 psig pressure for a period of 30 minutes, thereby forming a partially cured outer skin. After cure, a strip of teflon tape, adherent on one side, is applied to the nose area of the skin that will overly the compressible member 762. The tape is necessary to prevent epoxy saturation of the outer skin overlying the compressible member 762. The backing layer 754 is then selectively reinforced by applying a sheet of Ceiba-Geigy R6376/CGG108 epoxy impregnated graphite fabric to the inside surface of the outer skin from the edge of the tape to the trailing edge. Two sheets are applied, one corresponding to the inside of the upper surface and one corresponding to the inside of the lower surface of the outer skin. Further sheets of R6376/CGG108 are applied over areas corresponding to the valve inlet ports. Each sheet is about 12 inches wide and 1 inch narrower in width than the side sheets already applied and is shifted back one inch from the edge of the tape. A vacuum bag is then applied. The selectively reinforced backing layer 754 is cured under vacuum at 350° F. and 50 psig for 60 minutes.

The impulse tubes are formed from tightly woven nylon fabric impregnated with nitrile phenolic resin by the following process. A layer of AF32 film adhesive is applied to a release film. A preferable release film is catalogue no. Style 02232 Teflon coated fiberglass fabric produced by Furon-CHR Division. A layer of nylon fabric is laid over the film adhesive. A coat of A-626-B primer is applied which saturates and adheres the fabric to the film adhesive. Another layer of release film is applied over the fabric followed by a vacuum bag. Vacuum is applied at room temperature for a period of 120 hours. The impregnated fabric is removed from the vacuum bag and dried for 48 hours. It is important to note that this process can be used to impregnate AF32 into nearly any type of fabric.

Tube width usually ranges from ½ inch to 2 inches. Strips are cut from the impregnated fabric wide enough to form a tube to provide for a full width overlap (the width of the strip would be roughly three times the finished width of the tube). The fabric is most preferably cut on an angle in relation to the spanwise length of the tube. The preferred angle is 45° but may not be attainable depending on tube length unless a fabric is used that is prewoven on an angle of 45° in relation to its width. The fabric strip is placed on a flat surface with the coated side facing up. A strip of Teflon tape adherent on one side, preferably 3M 204/3 tape, with a width corresponding to the inside width of the finished tube is applied to the fabric strip. A billet, for example 0.030 inch thick Teflon plastic, with a width corresponding to the finished width of a tube is centered over the tape. The strip is then wrapped around the billet in a widthwise direction forming a lengthwise extending overlapped member corresponding to the width of the tube. The A-626-B primer can be used for tack. An additional strip is preferably wrapped around the first strip in the same manner forming a tube with a double thickness of material (quadruple thickness in the overlap area). Three tubes 757, 758 and 759 are formed by this process.

A tube matt is then assembled on the male tool. The process begins by applying a single layer of AF32 film adhesive to the surface of the tool. A layer of tightly woven nylon fabric is draped over the tool and manually conformed to its shape. A coat of A-626-B primer is applied that saturates and adheres the fabric to the layer of film adhesive. A layer of perforated release film is subsequently applied without wrinkles. After application of a vacuum bag, vacuum is continuously applied for at least 120 hours at room temperature thereby impregnating the film adhesive into the fabric. Following removal of the vacuum bag, the impregnated fabric is permitted to dry at room temperature for a period of at least 48 hours. This layer of impregnated fabric forms the back ply 763.

A strip of chlorobutyl rubber, cured to conform to the shape of the apex and trimmed to final width, is applied to the back ply 763 overlying the apex of the tool (corresponding to the apex 98 of the leading edge 99). The butyl rubber preferably has a Shore A durometer in a range between about 55 and 65. Tubes are similarly applied to the back ply 763 in the appropriate locations. The tube overlap 760, about 0.25 inch, is formed at this time. The release layer 761 is formed by applying teflon tape, preferably 3M 204/3 tape adherent on one side, over the assembled tube matt. The release layer 761 defines the extent of the unbonded area between the tube matt and skin 752. The back ply 763 is subsequently trimmed to within one inch of the edge of the release layer 761. The one inch tab of the back ply 763 is then folded up and over to form the upper peel tab 755 and lower peel tab 756. The entire assembly is then removed from the male tool and placed in the female tool with the release layer 761 against the surface of the tool. A vacuum bag is applied and the tube assembly is cured at 350° F. under 50 psig pressure for 30 minutes.

After cure, the tube assembly is removed from the female tool. Apertures are formed in the tubes for inlet valve fittings and exhaust ports. The valve fittings are located intermediate the ends of the tubes in numbers and locations sufficient to insure adequate ice removal. Each tube normally has two exhaust ports, one located at each end. The fittings are applied in the appropriate locations and additional nitrile phenolic impregnated fabric patches are applied for reinforcement. The tube assembly is then subjected to another cure in the female tool under vacuum at 350° and 50 psig for 30 minutes. The billets are then removed and the tube ends are closed using a diaper closure. The tube assembly is subjected to a third cure in the female tool under vacuum at 350° F. and 50 psig for 30 minutes.

After removing the tube assembly from the female tool, the completed skin 752 is inserted into the tool. Two one inch wide strips of Hysol EA-951 film adhesive are cut to the spanwise length of the upper peel tab 755 and lower peel tab 356. The strips are tacked to the peel tabs 755 and 756 using Hysol EA-952 primer. The tube assembly is then placed inside the skin 752 with the release layer 761 adjacent the inside surface of the skin 752 and taped in place. A vacuum bag is applied and the assembly is cured at 350° and 50 psig pressure for 60 minutes.

A plurality of epoxy impregnated fabric reinforcement plies are applied to the inside surface of the skin 752 and back ply 763 after removal from the female tool. The type of reinforcement ply depends on the aircraft manufacturer's specifications. For low speed aircraft, Ceiby-Geigy 913/CGG104 impregnated graphite fabric is suitable. The number of plies and their orientations is subject to aircraft manufacturer specifications and can be determined by those skilled in the art of composite material design and fabrication. At least three plies are recommended with at least one ply on a 45° angle relative to the chordwise direction. The plies must be cut and arranged to accommodate the valve fittings and vacuum ports. The assembly is subjected to a final cure in the female tool according to the reinforcement ply manufacturer's instructions.

After final cure, the part is trimmed to final dimensions. The erosion layer 753 consists of a polyurethane paint and is applied to the finished part either on a bench or after installment on an aircraft. Paint conforming to MIL-Z-83826 applied by spray is preferred.

The preferred mode of practicing the invention can vary depending on the application. Accordingly, a preferred embodiment for a propeller blade is presented in FIG. 8. A de-icer 850 is shown attached to a propeller blade 863. De-icer 850 is formed in a thin sheet that is subsequently attached to the propeller blade 863 by removable adhesive. The propeller blade 863 can be formed from metal or a fiber reinforced plastic composite and has an apex 820. Though not shown, propeller blade 863 can be recessed to accept de-icer 850 in which case the desired external shape of the propeller 863 is not effected.

The de-icer 850 is a unitary structure that is joined to the propeller blade 863 along bond line 862. The bond line 862 is preferably formed from adhesive that positively bonds de-icer 850 and withstands centrifugal forces during normal rotating use on a propeller. However, the adhesive must also be easy to remove in the field. An example of a suitable solvent based adhesive is 3M 1300L. The adhesive and de-icer must be removable without damage to the propeller blade 863.

A bond layer 861 is formed from 0.016 inch thick neoprene. A compressible member 853 is formed from butyl rubber and overlies the bond layer 861 over the apex 820. For a propeller blade, a width of about ⅜ inch has been found to be satisfactory for the compressible member 853. The desired width could change depending on the application and is empirically determined. A release layer 859 having good dielectric properties, for example 3M 204/3 teflon tape adherent on one side, is applied over the surface of the target 860. A target 860, formed from 0.016 inch thick copper sheet overlies the bond layer 861 abutting the compressible member along one edge. A mirror image target (not in view) is similarly prepared and overlies the bond layer 861 on the opposite side of the propeller blade 863 (not in view).

A coil is formed by bonding a copper sheet to each side of dielectric carrier 856. The dielectric layer 856 can be formed from synthetic rubber such as Neoprene, about 0.015 inch thick. A photoresist coil pattern is photographically applied to the surfaces of both copper sheets using a negative. The bond side coil member 857 and breeze side coil member 855 are subsequently etched from the copper sheets in an acid bath. Materials and techniques for applying photoresist and etching copper foil are well known to those skilled in the art of etching electrical circuits. A mirror image coil is similarly prepared for application to the opposite side (not in view) of propeller blade 863. The two coils can be formed simultaneously which permits the use of a continuous ribbon jumper 864 between coils. Power lead 867 is attached to the coil at electrical connection 866. A ring terminal connector 869 is attached to power lead 867. Another power lead (not in view) is similarly applied to the mirror image coil (not in view). Only two power leads are required if the planar coil and mirror image coil overlying the opposite side of propeller blade 863 (not in view) are connected in series by jumper 864.

The coil assembly is encapsulated by a breeze side dielectric layer 854 and a bond side dielectric layer 858. The mirror image coil is similarly encapsulated. The breeze side dielectric layer 854 is formed from Fiberite MXB 7669/120 glass. Applicant has found that a thin layer of glass stiffens the planar coil and significantly improves its dynamic motion by increasing the frequency response and maximum acceleration normal to the surface. Bond side dielectric layer 858 is formed from 0.016 inch thick neoprene. As shown in FIG. 8, the edges of the bond layer 861, bond side dielectric layer 858, dielectric carrier 856 and breeze side bond layer 854 are staggered relative to each other around the perimeter of the de-icer. Staggering the edges creates a tapered edge around the perimeter of the de-icer 850.

A splicing strip 852 is applied over the compressible member partially overlapping the breeze side dielectric ply 854 on each side of the member (the breeze side dielectric ply on the opposite side is not shown). The weave of splicing strip 852 is most preferably placed on a 45° angle relative to the chordwise direction of the propeller blade 863. Finally, a surface layer 851 is applied covering the entire construction as shown. The splicing strip 852 is formed from tightly woven nylon fabric coated with neoprene. The surface layer 851 is formed 0.020 inch thick neoprene. A leadtab 868 is formed by encapsulating power lead 867 between bond layer 861 and surface layer 851. Additional neoprene fill strips (not shown) can be laid along the power lead 867 to provide a smoother step-off. Neoprene fill strip 870 can be used to step-off the ends of the butyl strip compressible member 853. If desired, a layer 871 of catalogue no. 8671 Scotch polyurethane protective tape produced by 3M can be used to improve the erosion characteristics. The polyurethane film has a self-sticking acrylic adhesive on one side which sufficiently bonds the film to the surface layer 851. The polyurethane film can be replaced in the field when required due to erosion without replacing the entire de-icer 850. De-icer 850 is best constructed in a female tool starting with surface layer 851. Construction techniques are well known to those skilled in the art of rubber de-icer lay-up. The outer dielectric layer 854 must be cured to the planar coil before the coil is inserted into the construction.

Although the invention has been described with reference to certain and preferred embodiments, including the best embodiments, it would be apparent to people skilled in the art of de-icing of aircraft that other variations are possible which are obvious thereover. There variations are intended to be included by the present specification and appended claims.

I claim:

1. A de-icer adapted for attachment to a substructure having an apex where the radius of curvature of the substructure is smallest, the de-icer having an outer surface subjected to an impinging airstream, comprising:

skin means for transferring tension from a first area of said skin means to a second area of said skin means upon deflection of said first area away from the substructure, said skin means overlying the substructure with said first area spaced to one side of the apex and said second area at the apex;

skin deflection means disposed beneath said skin means for deflecting said skin means away from the substructure;

compressible means disposed beneath said second area for permitting deflection of said second area toward the substructure by compressing in response to tension transferred by said skin means from said first area to said second area upon deflection of said first area away from the substructure.

2. The de-icer of claim 1 wherein said compressible means divides said skin deflection means, said compressible means being immediately subjacent said skin means, and said skin deflection means abuts said compressible means.

3. The de-icer of claim 1 wherein said skin deflection means overlies said compressible means, said skin deflection means being immediately subjacent said skin means.

4. The de-icer of claims 1, 2 or 3 wherein said compressible means is comprised of an elastomer.

5. The de-icer of claims 1, 2 or 3 wherein said compressible means is comprised of butyl rubber.

6. The de-icer of claim 5 wherein said compressible means has a thickness between about 0.05 and 0.1 inch.

7. The de-icer of claim 1, 2 or 3 wherein said skin means includes at least one layer of fiber reinforced plastic that selectively stiffens said skin means in a predetermined area.

8. The de-icer of claim 1, 2, or 3 wherein said skin means includes at least one layer of fabric impregnated with nitrile phenolic matrix, the fibers of said fabric layer being selected from a group consisting of carbon fibers, glass fibers, nylon fibers, and aramid fibers.

9. The de-icer of claim 2 wherein the substructure has a chordwise direction generally parallel to the direction of the impinging airstream and a spanwise direction in which the substructure extends generally perpendicular to the chordwise direction, and said skin deflection means comprises at least two expandable tubes extending in the spanwise direction, one each on either side of said compressible means, each said tube abutting said compressible means.

10. The de-icer of claim 3 wherein the substructure has a chordwise direction generally parallel to the direction of the impinging airstream and a spanwise direction in which the substructure extends generally perpendicular to the chordwise direction, and said skin defection means comprises at least two expandable tubes extending in the spanwise direction, said tubes abutting each other over said compressible means.

11. The de-icer of claim 3 wherein the substructure has a chordwise direction generally parallel to the direction of the impinging airstream and a spanwise direction in which the substructure extends generally perpendicular to the chordwise direction, and said skin deflection means comprises at least three expandable tubes extending in the chordwise direction, one tube overlying said compressible means, the other two tubes being disposed on either side of and abutting said tube overlying said compressible means.

12. The de-icer of claim 9 wherein said skin deflection means further comprises at least a third expandable tube extending in the spanwise direction abutting one of said previous two tubes, said abutting tubes partially overlapping in the chordwise direction.

13. The de-icer of claim 1 wherein said skin deflection means comprises electromagnetic apparatus, said electromagnetic apparatus being of the type that utilizes a high magnitude short duration current pulse to develop opposing electromagnetic fields that cause said skin means to be deflected from the substructure.

14. The de-icer of claim 13 wherein said electromagnetic apparatus includes at least one coil, said high magnitude short duration current pulse being applied to each coil, each coil including:

a first, sheet-like member defined by a first, continuous, electrical conductor having a plurality of turns and first and second ends, said first end of said first conductor defining an electrical input and said second end of said first conductor defining an electrical output;

a second, sheet-like member defined by a second, continuous, electrical conductor having a plurality of turns and first and second ends, said first end of said second conductor defining an electrical input, and said second end of said second conductor defining an electrical output;

an electrical connection between said second end of said first conductor and said first end of said second conductor; and said first and second sheet-like members being disposed parallel to each other with selected turns of said first electrical conductor being positioned adjacent to selected turns of said second electrical conductor such that said direction of current flow through the turns of said first conductor is in the same direction as the current flow through the turns of said second conductor.

15. The de-icer of claim 14 wherein said electromagnetic apparatus comprises at least two coils, one each on either side of said compressible means, each coil abutting said compressible means.

16. The de-icer of claim 15 wherein at least one coil is formed as an integral part of said skin means.

17. The de-icer of claim 13 wherein said skin means includes at least one layer of fabric impregnated with nitrile phenolic matrix, the fibers of said fabric layer being selected from a group consisting of carbon fibers, glass fibers, nylon fibers, and aramid fibers.

18. The de-icer of claim 14 wherein said thin compressible means is comprised of butyl rubber.

19. The de-icer of claim 18 wherein said thin compressible means has a thickness of between about 0.05 and 0.1 inch.

20. The de-icer of claim 14 further comprising a target adjacent each coil, said target being superposed over said coil, said coil being separable from said target, one of the opposing electromagnetic fields being developed by said coil upon application of said high magnitude short duration current pulse and the other opposing electromagnetic field being developed in said target by eddy currents induced by said coil electromagnetic field.

21. The de-icer of claim 14 further comprising at least two coils, said coils being adjacent each other with one coil superposed over said other coil, said coils being separable from each other, one of the opposing electromagnetic fields being developed upon application of said high magnitude short duration current pulse to one coil and the other opposing electromagnetic field being developed upon application of said high magnitude short duration current pulse to said other coil, said coils being electrically interconnected such that current direction in said selected turns of said conductor of one coil is opposite to said current direction in said selected turns of said conductor of said other coil.

22. The de-icer of claim 3 wherein said skin deflection means includes electromagnetic apparatus, said electromagnetic apparatus being of the type that utilizes a high magnitude short duration current pulse to develop opposing electromagnetic fields that cause said skin to be deflected from the substructure, the electromagnetic apparatus comprising at least two coils abutting each other along an edge overlying the apex, said high magnitude short duration current pulse being applied to each coil, each coil including:

a first, sheet-like member defined by a first, continuous, electrical conductor having a plurality of turns and first and second ends, said first end of said first conductor defining an electrical input and said second end of said first conductor defining an electrical output;

a second, sheet-like member defined by a second, continuous, electrical conductor having a plurality of turns and first and second ends, said first end of said second conductor defining an electrical input, and said second end of said second conductor defining an electrical output;

an electrical connection between said second end of said first conductor and said first end of said second conductor; and said first and second sheet-like members being disposed parallel to each other with selected turns of said first electrical conductor being positioned adjacent to selected turns of said second electrical conductor such that the direction of current flow through the turns of the first conductor is in the same direction as the current flow through the turns of the second conductor.

23. The de-icer of claim 3 wherein said skin deflection means includes electromagnetic apparatus, said electromagnetic apparatus being of the type that utilizes a high magnitude short duration current pulse to develop opposing electromagnetic fields that cause said skin to be deflected from the substructure, said electromagnetic apparatus comprising at least three coils, one coil overlying said compressible means in between and abutting said other two coils, said high magnitude short duration current pulse being applied to each coil, each coil including:

a first, sheet-like member defined by a first, continuous, electrical conductor having a plurality of turns and first and second ends, said first end of said first conductor defining an electrical input and said second end of said first conductor defining an electrical output;

a second, sheet-like member defined by a second, continuous, electrical conductor having a plurality of turns and first and second ends, said first end of said second conductor defining an electrical input, and said second end of said second conductor defining an electrical output;

an electrical connection between said second end of said first conductor and said first end of said second conductor; and said first and second sheet-like members being disposed parallel to each other with selected turns of said first electrical conductor being positioned adjacent to selected turns of said second electrical conductor such that the direction of current flow through the turns of said first conductor is in the same direction as the current flow through the turns of said second conductor.

24. The de-icer of claim 1 wherein said skin deflection means is further for deflecting said skin means away from the substructure with a peak acceleration of at least about 3000 g's.

25. The de-icer of claim 1 wherein said skin deflection means is further for deflecting said skin means away from the substructure at a rate of at least about 2000 Hz.

26. The de-icer of claim 1 wherein said skin deflection means is further for deflecting said skin means away from the substructure between about 0.02 inch and 0.06 inch.

27. The de-icer of claim 1 wherein said skin means has a modulus of elasticity of at least 40,000 kPa.

28. The de-icer of claim 1 wherein said compressible means has a durometer of less than about a Shore A 90.

29. The de-icer of claim 1 wherein said compressible means has a durometer between about a Shore A55 and a Shore A 65.

30. The de-icer of claim 1 wherein said skin means comprises a fabric layer.

31. The de-icer of claim 38 wherein said fabric layer transfers tension from said first area to said second area upon deflection of said first area away from the substructure.

32. A method of deicing a substructure having an apex where the radius of curvature of the substructure is smallest, the method comprising the steps of:
 a) providing a deflectable skin over the substructure;
 b) providing a compressible member at the apex beneath said deflectable skin;
 c) deflecting said deflectable skin away from the substructure with an attendant deflection of said deflectable skin over the apex toward the substructure resisted by compression of said compressible member.

33. The method of claim 32 wherein the step of deflecting said deflectable skin away from the substructure occurs with a peak acceleration of at least about 3000 g's.

34. The method of claim 32 wherein the step of deflecting said deflectable skin away from the substructure occurs at a rate of at least about 2000 Hz.

35. The method of claim 32 wherein the step of deflecting said deflectable skin away from the substructure occurs with a deflection between about 0.02 inch and 0.06 inch.

36. A method of de-icing a substructure having an apex where the radius of curvature of the substructure is smallest, the method comprising the steps of:
 a) providing a deflectable skin over the substructure;
 b) providing a compressible member at the apex beneath said deflectable skin;
 b) developing tension in said deflectable skin by deflecting said deflectable skin away from the substructure over an area spaced to one side of the apex;
 c) transferring said tension to the apex from said area spaced to one side of the apex;
 d) deflecting said skin overlying the apex toward the substructure resisted by compression of said compressible member in response to said tension transferred to the apex.

37. The method of claim 36 wherein the step of deflecting said deflectable skin away from the substructure over an area spaced to one side of the apex occurs with a peak acceleration of at least about 3000 g's.

38. The method of claim 36 wherein the step of deflecting said deflectable skin away from the substructure over an area spaced to one side of the apex occurs at a rate of at least about 2000 Hz.

39. The method of claim 36 wherein the step of deflecting said deflectable skin away from the substructure over an area spaced to one side of the apex occurs with a deflection between about 0.02 inch and 0.06 inch.

40. A method of de-icing a substructure having an apex where the radius of curvature of the substructure is smallest, the method comprising the steps of:
 a) providing a deflectable skin over the substructure;
 b) providing a compressible member at the apex beneath said deflectable skin; and
 b) deflecting said deflectable skin away from the substructure over an area spaced to one side of the apex by stretching said deflectable skin and by compressing said compressible member.

41. The method of claim 40 wherein the step of deflecting said deflectable skin away from the substructure over an area spaced to one side of the apex occurs with a peak acceleration of at least about 3000 g's.

42. The method of claim 40 wherein the step of deflecting said deflectable skin away from the substructure over an area spaced to one side of the apex occurs at a rate of at least about 2000 Hz.

43. The method of claim 40 wherein the step of deflecting said deflectable skin away from the substructure over an area spaced to one side of the apex occurs with a deflection between about 0.02 inch and 0.06 inch.

* * * * *